(12) United States Patent
Hokari et al.

(10) Patent No.: US 9,401,827 B2
(45) Date of Patent: Jul. 26, 2016

(54) SEMICONDUCTOR DEVICE AND INFORMATION PROCESSING SYSTEM

(71) Applicant: Hitachi, Ltd., Tokyo (JP)

(72) Inventors: Tomofumi Hokari, Tokyo (JP); Makoto Kuwata, Tokyo (JP); Takeshi Isezaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 220 days.

(21) Appl. No.: 14/190,691

(22) Filed: Feb. 26, 2014

(65) Prior Publication Data

US 2014/0321301 A1 Oct. 30, 2014

(30) Foreign Application Priority Data

Apr. 25, 2013 (JP) .................................. 2013-092002

(51) Int. Cl.
| | |
|---|---|
| *H04B 3/00* | (2006.01) |
| *H04L 25/02* | (2006.01) |
| *H04L 25/03* | (2006.01) |
| *H04L 25/20* | (2006.01) |
| *H04L 7/033* | (2006.01) |

(52) U.S. Cl.
CPC ............ *H04L 25/0262* (2013.01); *H04L 7/033* (2013.01); *H04L 25/03878* (2013.01); *H04L 25/20* (2013.01)

(58) Field of Classification Search
CPC ................... H01L 2924/0002; H01L 25/0262; H01L 25/20; H01L 12/26; H01L 43/08; H01L 43/12; H01L 43/50; H01L 2924/00; H01L 2025/03363; H01L 7/0045; H01L 25/03878; H01L 7/0033; Y02B 60/31
USPC ............. 375/375, 257, 260; 370/252; 702/78; 714/731
See application file for complete search history.

(56) References Cited

U.S. PATENT DOCUMENTS

2012/0191393 A1* 7/2012 Satou .................... G01R 23/155
702/78

FOREIGN PATENT DOCUMENTS

| JP | 2005-020308 A | 1/2005 |
|---|---|---|
| JP | 2012-156676 A | 8/2012 |

* cited by examiner

*Primary Examiner* — Rahel Guarino
(74) *Attorney, Agent, or Firm* — Brundidge & Stanger, P.C.

(57) ABSTRACT

A semiconductor device capable of determining plural transfer speeds with a small-scale circuit, and an information processing system having the semiconductor device are provided. The semiconductor device has a frequency determining circuit that receives a data signal on which plural transfer speeds can be set and that determines a transfer speed of the data signal. The frequency determining circuit latches the data signal at each of plural timings continuing with a predetermined interval, detects how many times a data switching occurs consecutively, based on the latched plural data, and determines the transfer speed of the data signal from the result of the detection.

14 Claims, 17 Drawing Sheets

DAT : DATA SIGNAL
FJDGU : FREQUENCY DETERMINING CIRCUIT

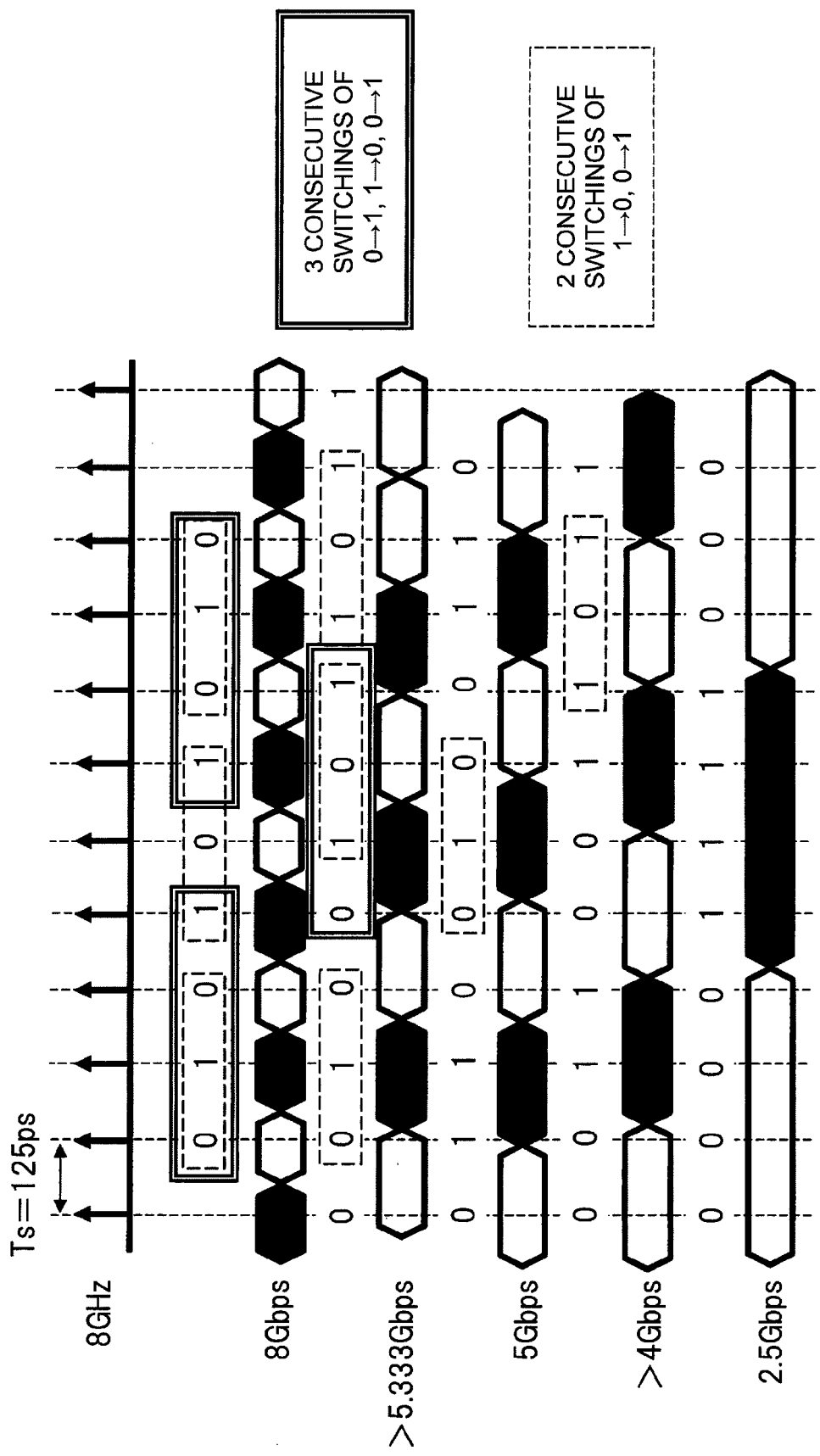

| No | FREQUENCY DETERMINATION PATTERN | DATA PATTERN | BOUNDARY FOR DETERMINATION | |
|---|---|---|---|---|
| | | | (ps) | (Gbps) |
| 0 | 2 CONSECUTIVE SWITCHINGS | 0<u>1</u>0 | 250.0 | 4.00 |
| 1 | 3 CONSECUTIVE SWITCHINGS | 0<u>10</u>1 | 187.5 | 5.33 |
| 2 | 4 CONSECUTIVE SWITCHINGS | 01<u>01</u>0 | 166.7 | 6.00 |
| 3 | 5 CONSECUTIVE SWITCHINGS | 01<u>010</u>1 | 156.3 | 6.40 |
| 4 | 6 CONSECUTIVE SWITCHINGS | 01<u>0101</u>0 | 150.0 | 6.67 |
| 5 | 7 CONSECUTIVE SWITCHINGS | 01<u>01010</u>1 | 145.8 | 6.86 |

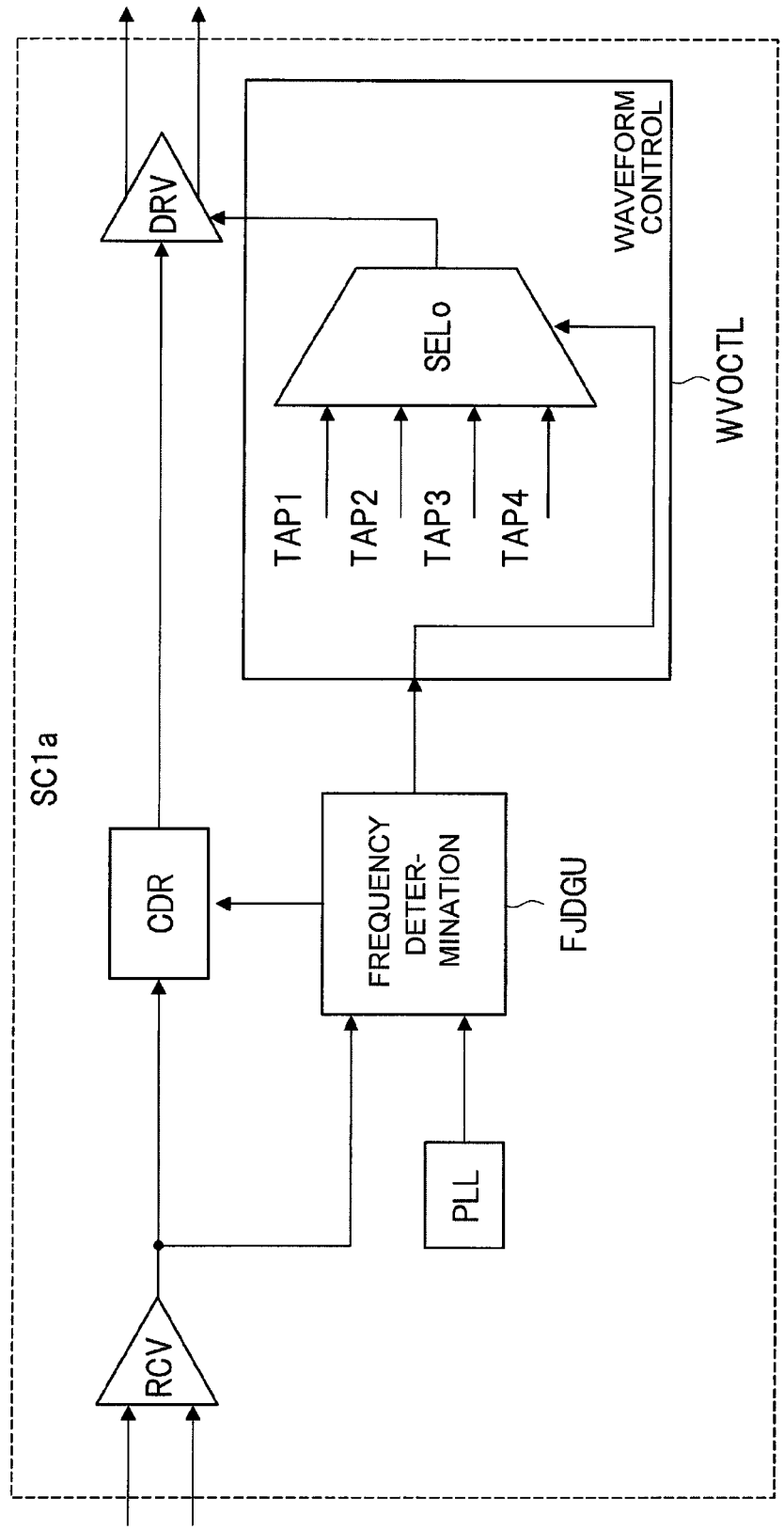

| No | FREQUENCY DETERMINATION PATTERN | DATA PATTERN | BOUNDARY FOR DETERMINATION | |
|---|---|---|---|---|
| | | | (ps) | (Gbps) |
| 0 | SWITCHING WITH 1-BIT INTERVAL | 0110 | 375.0 | 2.67 |
| 1 | SWITCHING WITH 2-BIT INTERVAL | 01110 | 500.0 | 2.00 |
| 2 | SWITCHING WITH 3-BIT INTERVAL | 011110 | 625.0 | 1.60 |
| 3 | SWITCHING WITH 4-BIT INTERVAL | 0111110 | 750.0 | 1.33 |
| 4 | SWITCHING WITH 5-BIT INTERVAL | 01111110 | 875.0 | 1.14 |
| 5 | SWITCHING WITH 6-BIT INTERVAL | 011111110 | 1000.0 | 1.00 |

SEMICONDUCTOR DEVICE AND INFORMATION PROCESSING SYSTEM

CROSS-REFERENCE TO RELATED APPLICATION

This application claims the priority of Japanese Patent Application No. 2013-092002, filed Apr. 25, 2013, which is incorporated herein by reference in its entirety.

BACKGROUND OF THE INVENTION

1. Field of the Invention

The present invention relates to a semiconductor device and an information processing system, and for example, to a semiconductor device that determines the transfer speed of a data signal on which different transfer speeds can be set, and an information processing system that carries out communication via the semiconductor device.

2. Description of the Related Art

JP-A-2012-156676, for example, discloses a method in which data signals including long and short pulse widths are received and a signal having a shorter pulse width than a predetermined pulse width is detected and counted, thereby determining the frequency. JP-A-2005-20308 discloses a method in which the clock width of a predetermined number of clocks included in received synchronizing clocks is detected by counting with clocks having higher frequencies than those clocks, then an average value thereof is calculated, and a sampling clock is generated based on the average value.

As information communication devices are becoming increasingly high-speed, for example, transmission rates used for data transmission between LSIs (large scale integrations) within devices are rising, making long-distance transmission particularly difficult. To cope with this problem, a buffer/repeater LSI (referred to, for example, as a signal conditioner) that is inserted in a transmission line of a high-speed serial interface in a device to enable extension of transmission distance is developed. Functions of this LSI to deal with long-distance high-speed transmission may include a receiver to receive signals with small amplitude, a CDR (clock data recovery) to re-time received signals and eliminate jitter, a driver to send out a waveform with large amplitude on which equalization is carried out, and the like. These functions are common techniques that are also used in LSIs such as ASIC (application specific integrated circuit).

Meanwhile, a function of discriminating a transfer speed based on a received data signal is necessary as a signal conditioner-specific function. In order to send and receive a data signal properly via a serial interface, it is desirable to discriminate the transfer speed of a data signal passing through the transmission line and perform waveform equalization or the like corresponding to the transfer speed. As a method for discriminating a transfer speed, for example, it is conceivable to install a logic conforming to serial interface standards and simply read information or the like of the transfer speed included in a communication format defined by the standards. However, such a method has a risk of causing an increase in logic scale and power consumption. Also, there can be circumstances that can only be dealt with by specific serial interface standards.

Thus, a method for discriminating a transfer speed based on a received data signal in the state where there is no protocol analysis based on high-order logic is demanded. As such a method, for example, the methods disclosed in the JP-A-2012-156676 and JP-A-2005-20308 may be employed. However, the method of JP-A-2012-156676 detects the presence or absence of a narrower pulse width than a predetermined pulse width and therefore is suitable for discrimination between two types of transfer speeds. To discriminate three or more types of transfer speeds, for example, measures such as providing plural types of predetermined pulse widths are needed, and this raises concerns about an increase in logic scale and power consumption. The method of JP-A-2005-20308 detects the clock width of synchronizing clocks and therefore needs higher-speed clocks. Thus, the method may be difficult to implement, for example, if the synchronizing clocks themselves are high-speed.

SUMMARY OF THE INVENTION

In view of the foregoing circumstances, it is an object of the invention to provide a semiconductor device capable of determining plural transfer speed with a small-scale circuit, and an information processing system having the semiconductor device. The above and other objects and novel features of the invention will be clarified based on the description of the specification and the accompanying drawings.

A representative embodiment of the invention disclosed here is briefly outlined as follows.

A semiconductor device according to an embodiment includes a first frequency determining circuit that receives a data signal on which plural transfer speeds can be set and that determines a transfer speed of the data signal. The first frequency determining circuit latches the data signal at each of plural timings continuing with a predetermined interval, then detects how many times data switching occurs consecutively, based on the latched plural data, and determines the transfer speed of the data signal from the result of the detection.

An advantageous effect of the representative embodiment of the invention disclosed here can be briefly described as having the ability to determine plural transfer speeds with a small-scale circuit.

BRIEF DESCRIPTION OF THE DRAWINGS

FIG. 4 is a waveform showing an example of the operation principle of the frequency determining circuit of FIG. 3.

FIG. 9A is a block diagram showing an example of the detailed configuration of the signal conditioner device of FIG. 2 in a semiconductor device according to Embodiment 3 of the invention.

DESCRIPTION OF PREFERRED EMBODIMENTS

Figure 1:
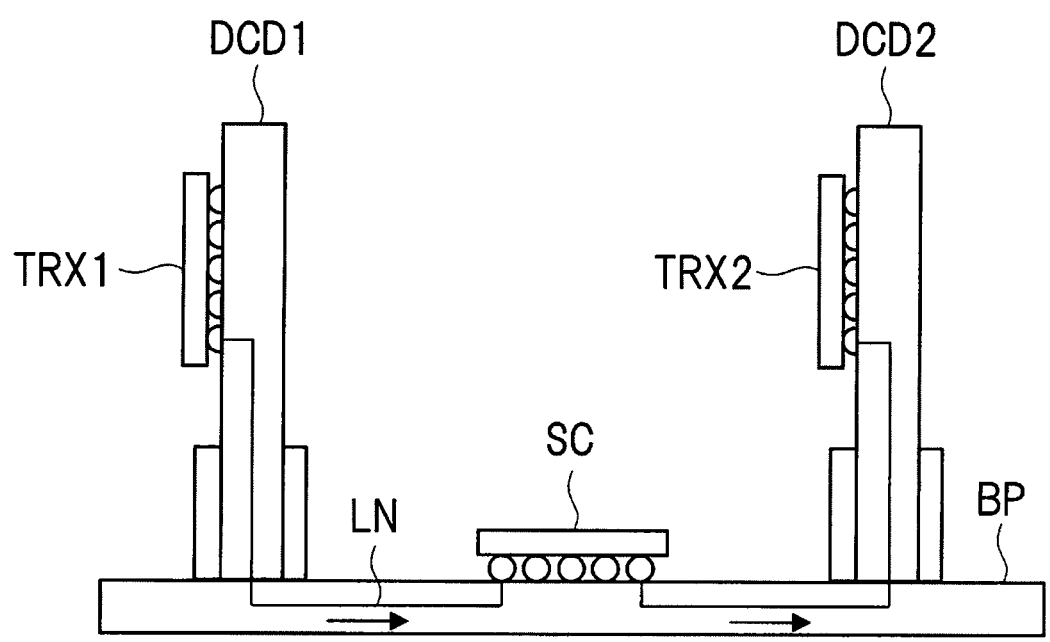
FIG. 1 is a cross-sectional view showing an example of the schematic configuration of an information processing system according to Embodiment 1 of the invention.

In the following description of embodiments, plural embodiments or sections are used for explanation when necessary in terms of convenience. However, these embodiments or sections are not unrelated to each other but one embodiment or section may be a modification, detail, supplementary explanation or the like of a part or the whole of another embodiment or section, unless stated otherwise. Also, in the following description of embodiments, where numbers relating to elements (including the numbers of components, numeric values, amounts, ranges and the like) are mentioned, these specific numbers are not limiting, and numbers equal to or greater than the specific numbers or numbers equal to or smaller than the specific numbers may also be used, unless otherwise stated and unless the specific numbers are obviously limiting in terms of principles.

Moreover, in the following description of embodiments, as a matter of course, components thereof (including component steps and the like) are not necessarily essential unless otherwise stated and unless the components are considered obviously essential in terms of principles. Similarly, in the following description of embodiments, where the shapes, positional relations and the like of components are mentioned, those substantially proximate or similar to the shapes and the like mentioned are included unless otherwise stated and unless such is considered obviously inapplicable. This also applies to the aforementioned numeric values and ranges.

Hereinafter, embodiments of the invention will be described in detail with reference to the drawings. In the entire drawings for explaining the embodiments, the same members are basically denoted by the same reference numerals and the description thereof will not be repeated.

Outline of Embodiments

A semiconductor device according to this embodiment has a first frequency determining circuit (for example, FJDGU 1 of FIG. 3 or the like) that receives a data signal on which plural transfer speeds can be set, and that determines the transfer speed of the data signal. The first frequency determining circuit latches the data signal at each of plural timings continuing with a predetermined interval, then detects how many times a switching of data occurs consecutively, based on the latched plural data, and determines the transfer speed of the data signal from the result of the detection (see, for example, FIG. 4 or the like).

Specifically, for example, a pattern "010" (or "101") in the case where two switchings between '0' and '1' in the data signal occur consecutively and a pattern "0101" (or "1010") in the case where three switchings occur consecutively, are defined in advance according to the number of transfer speed levels to be determined. The first frequency determining circuit determines the transfer speed (that is, frequency) as high speed if there is a pattern of three consecutive switchings in the latched plural data, as mid speed if there is no pattern of three consecutive switchings and there is a pattern of two consecutive switching, and as low speed in any other case. Thus, typically, in a transmission system capable of operating at plural transfer speeds, plural transfer speeds can be determined by a small-scale circuit.

Embodiment 1

Outline of Information Processing System

FIG. 1 is a cross-sectional view showing an example of the schematic configuration of an information processing system according to Embodiment 1 of the invention. The information processing system of FIG. 1 is, for example, a network server system and includes a backplane BP, and daughter cards (wiring boards) DCD1, DCD2 suitably connected to connectors on the backplane BP. Transmitter-receiver devices (first and second semiconductor devices) TRX1, TRX2 are mounted on the DCD1, DCD2, respectively. A signal conditioner device (third semiconductor device) SC is mounted on the backplane BP. Each of TRX1, TRX2 and SC is formed, for example, by a single packaged component.

The backplane BP carries out communication between the daughter cards DCD1, DCD2, power supply to DCD1, DCD2, and the like. Thus, a communication channel via a transmission line LN inside DCD1, DCD2 and inside BP is constructed between the transmitter-receiver device TRX1 and the transmitter-receiver device TRX2. In this example, TRX1 sends out a data signal to LN, and TRX2 receives the data signal transmitted via LN. BP may have a size such that one side is in the order of meters. Therefore, the signal conditioner device SC is inserted in the transmission line LN and used, for example, for the purpose of buffering a data signal transmitted over a long distance and for the purpose of waveform shaping or the like. The mounting of SC on BP is not limiting and SC may also be mounted on DCD1, DCD2.

The transmitter-receiver devices TRX1, TRX2 carry out communication based on the PCI Express standard, though not particularly limited thereto. For example, according to the latest serial interface standard such as PCI Express Gen3, high-speed communication is carried out while maintaining downward compatibility, and operation at plural transfer speeds from low to high speeds is required. Specifically, according to this standard, for example, communication is carried out between TRX1 and TRX2 initially at a low transfer speed based on the downward compatibility standard, and if it becomes known during the communication that both devices are conformable to an upper standard, negotiation processing to shift to a high transfer speed based on the upper standard is carried out.

If a signal conditioner device without having a function of determining the transfer speed is used, proper waveform shaping or the like corresponding to the transfer speed during the operation cannot be carried out. Therefore, particularly in long-distance transmission, the waveform of the data signal may collapse, causing an increase in bit errors and the like. Thus, for example, it is conceivable that a logic circuit that recognizes the communication format defined by the communication protocol and reads speed information may be provided. However, in this case, the scale of the logic circuit and the power consumed thereby increase. Also, there can be a circumstance that can only be dealt with by a specific communication protocol. Thus, it is advantageous to use the method according to the embodiment, which is described below.

Outline of Signal Conditioner Device (Semiconductor Device)

Figure 2:
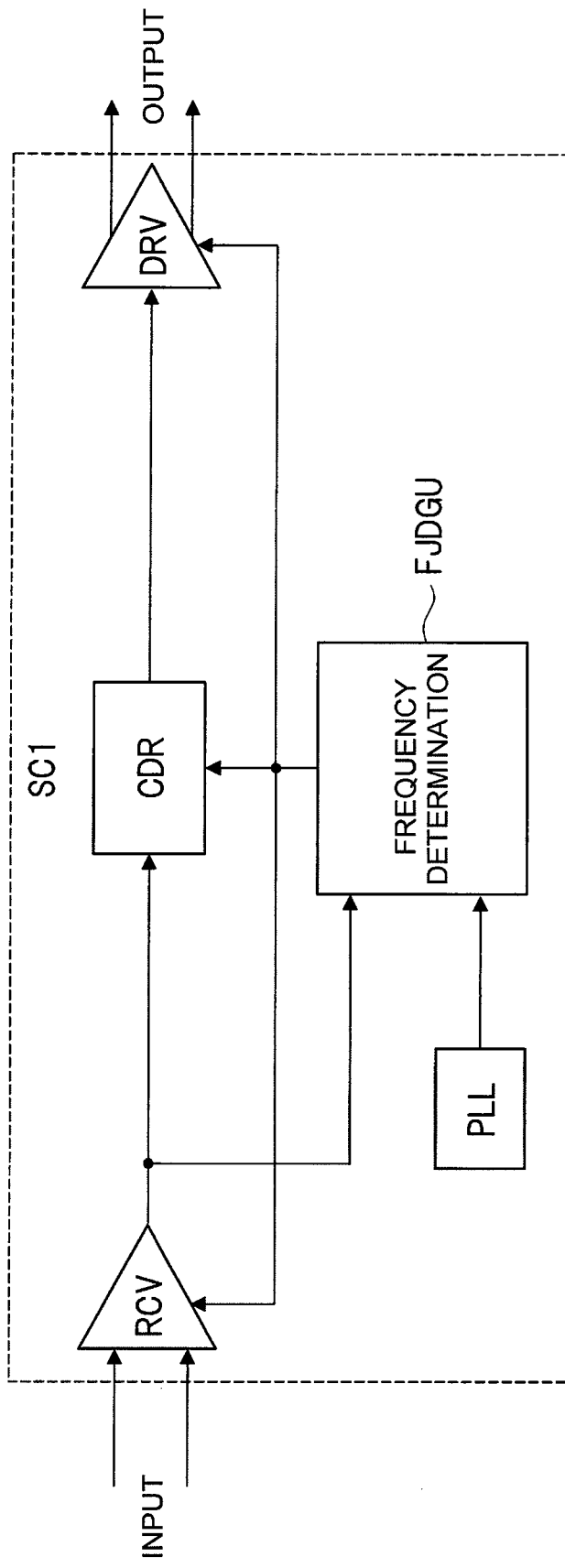
FIG. 2 is a block diagram showing an example of the schematic configuration of a main portion of a signal conditioner device in the information processing system of FIG. 1.

FIG. 2 is a block diagram showing an example of the schematic configuration of a main portion of the signal conditioner device in the information processing system of FIG. 1. A signal conditioner device (semiconductor device) SC1 shown in FIG. 2 has a receiver circuit RCV, a clock data reproducing circuit CDR, a driver circuit DRV, a frequency determining circuit FJDGU, and a clock generating circuit PLL. RCV receives, for example, a data signal from the transmitter-receiver device (first semiconductor device) TRX1 of FIG. 1. CDR reproduces a data signal and a clock signal from the data signal outputted from RCV. DRV transmits the data signal reproduced by CDR, for example, to the transmitter-receiver device (second semiconductor device) TRX2 of FIG. 1. For the data signal received by RCV and the data signal transmitted from DRV, for example, differential signals are used for high-speed transmission.

The clock data reproducing circuit CDR reproduces the data signal by performing processing such as re-timing and jitter elimination on the data signal. For example, according to the PCI Express standard or the like, a so-called clock embedded method in which the clock signal is embedded in the data signal is used. Therefore, the reproduced clock signal is used to reproduce the data signal. The frequency determining circuit FJDGU receives the data signal outputted from the receiver circuit RCV and determines the transfer speed (frequency) of the data signal by using the clock signal generated by the clock generating circuit PLL. The result of this determination is used for waveform shaping or the like in RCV and/or the driver circuit DRV and also used for reproduction of the clock signal in CDR or the like.

Outline of Frequency Determining Circuit

Figure 3:
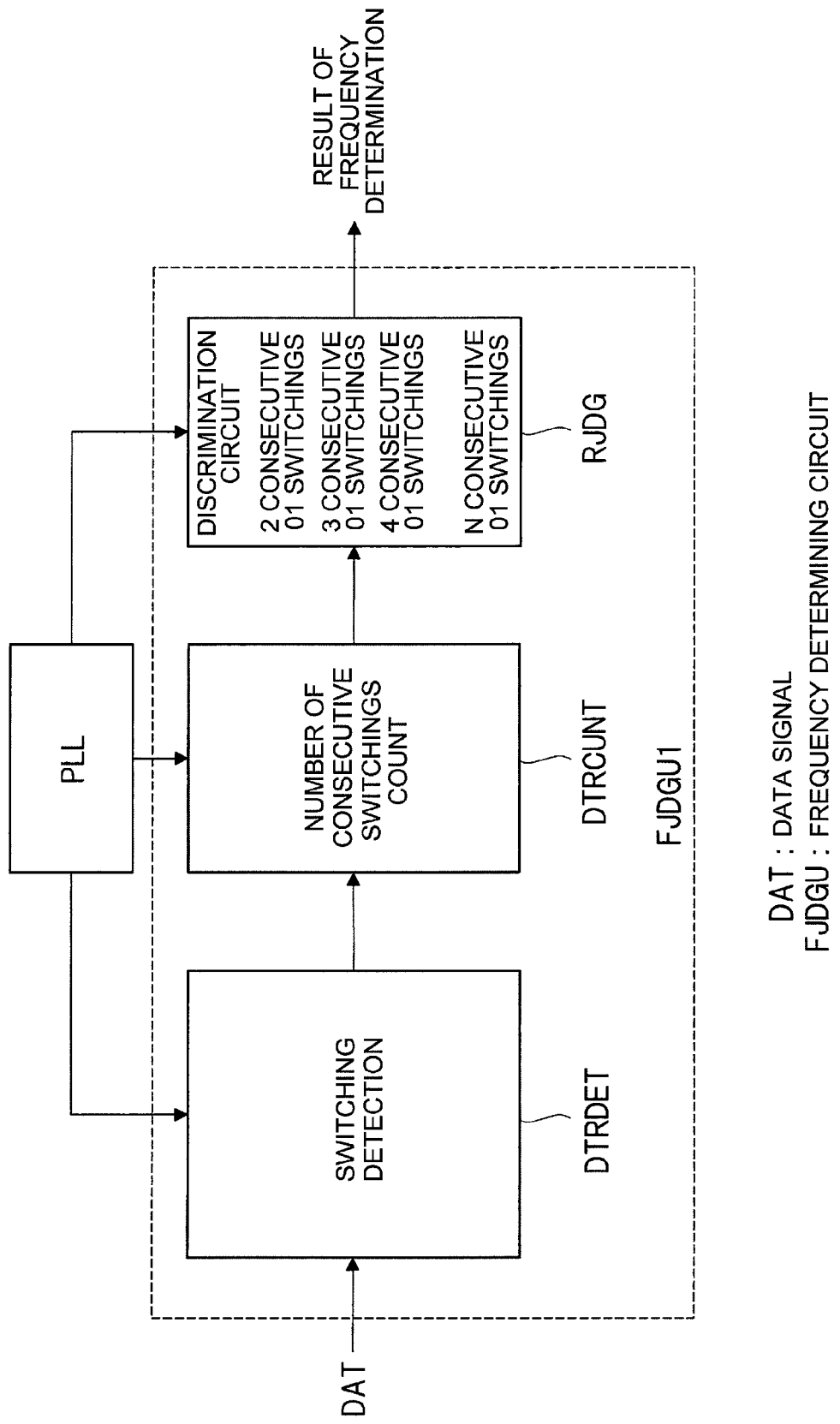
FIG. 3 is a block diagram showing an example of the configuration of a frequency determining circuit in the signal conditioner device of FIG. 2.

FIG. 3 is a block diagram showing an example of the configuration of the frequency determining circuit in the signal conditioner device of FIG. 2. A frequency determining circuit (first frequency determining circuit) FJDGU1 shown in FIG. 3 has a switching detection circuit DTRDET, a counter circuit (first counter circuit) DTRCUNT, and a discrimination circuit (first discrimination circuit) RJDG. DTRDET latches a data signal DAT at each of plural timings continuing with a predetermined interval and detects a switching of data based on the latched plural data. DTRCUNT counts how many times the switching detected by DTRDET occurs consecutively. RJDG determines a frequency from the count value counted by DTRCUNT, based on the relation between the number of consecutive switchings and the frequency that are associated with each other in advance.

FIG. 4 is a waveform showing an example of the operation principle of the frequency determining circuit of FIG. 3. Here, as a specific example, a case where frequency determination about a data signal is carried out based on PCI Express Gen3 is described. According to PCI Express Gen3, three types of transfer speeds, 2.5 Gbps, 5.0 Gbps and 8.0 Gbps per lane, need to be supported as transfer speeds of data signals. The unit intervals of 1 data bit for these transfer speeds are 400 ps, 200 ps and 125 ps, respectively. Transmitted data patterns are substantially random due to functions of a scrambler or the like prescribed by the standard and therefore include data patterns having pulse widths of 400 ps×N, 200 ps×M and 125 ps×K (N, M, K being integers equal to or greater than 1), respectively.

The switching detection circuit DTRDET of FIG. 3 latches such data at each of plural timings continuing with a predetermined interval Is (here, Ts=125 ps) and thereby detects data switchings. Specifically, DTRDET refers to the result of latching at two consecutive timings in order and determines that there is a data switching if one is '0' and the other is '1'. The counter circuit (first counter circuit) DTRCUNT counts how many times the data switching detected by DTRDET occurs consecutively. For example, if the result of latching is "0100", DTRDET detects the switching of '0'→'1' and the switching of '1'→'0' consecutively, and DTRCUNT counts the number of these consecutive detections (here, twice).

While the data signals are shown in FIG. 4 as repetitive data patterns of 0/1 as a matter of convenience, in practice, these data signals are random data patterns. However, if the data signals are observed for a predetermined period that can be predicted from the communication protocol, the repetitive data pattern of 0/1 shown in FIG. 4 emerges at least in a certain period thereof. Thus, the frequency determining circuit (first frequency determining circuit) FJDGU1 of FIG. 3, in practice, observes the data signals for this predetermined period or longer and then determines the frequency based on the result of the observation.

In FIG. 4, if a data signal of 2.5 Gbps is inputted and the data signal is latched (that is, sampled) at a timing of 8 GHz, the 01 switching (that is, '0'→'1' or '1'→'0') does not occur twice or more consecutively, not matter what data pattern is inputted. Therefore, the maximum count value by the counter circuit DTRCUNT is "1". The discrimination circuit (first discrimination circuit) RJDG recognizes that the 01 switching is not detected twice or more consecutively, and can determine that the transfer speed is 2.5 Gbps.

In the case of operation at 5.0 Gbps, 200-ps random data is sampled every 125 ps. Therefore, the 01 switching may be detected twice consecutively, depending on the intake timing of the data signal. That is, data patterns "00100" and "11011" may be detected. However, the 01 switching is not detected three times or more consecutively. Therefore, the maximum count value by the counter circuit DTRCUNT is "2". The discrimination circuit RJDG recognizes that the 01 switching may be detected twice consecutively but not three times or more consecutively, and can determine that the transfer speed is 5.0 Gbps.

Finally, if the 01 switching is detected three times or more consecutively, the maximum count value by the counter circuit DTRCUNT is "3" or greater. Thus, the discrimination circuit RJDG recognizes that the transfer speed is not 2.5 Gbps or 5.0 Gbps, and therefore can determine that the data is transferred at 8.0 Gbps. The data pattern in this case is "0101" or "1010".

Figures 5A, 5B:
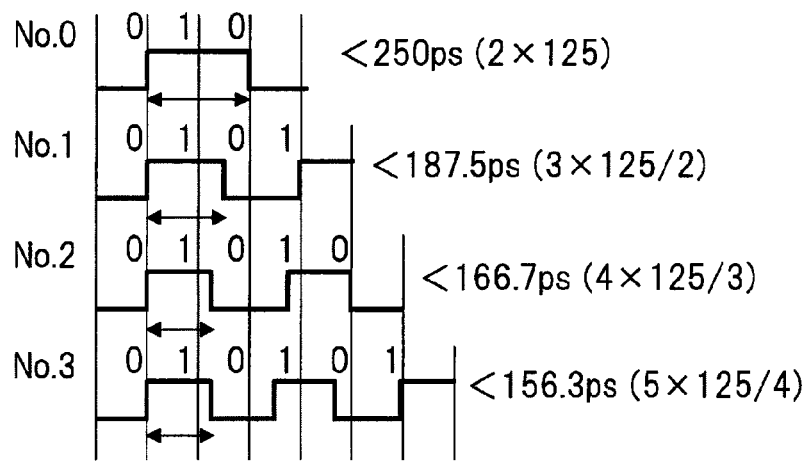
FIG. 5A is a supplementary view of FIG. 4, showing an example of the relation between the number of consecutive 01 switchings and the boundary of transfer speed in the case where a data signal is sampled at timings of 8 GHz.
FIG. 5B is a supplementary view of FIG. 4, showing an example of the relation between the number of consecutive 01 switchings and the boundary of transfer speed in the case where a data signal is sampled at timings of 8 GHz.

FIGS. 5A and 5B are supplementary views of FIG. 4, showing an example of the relation between the number of consecutive 01 switchings and the boundary of transfer speed in the case where a data signal is sampled at a timing of 8 GHz. As shown at "No. 0" in FIGS. 5A and 5B, two consecutive data switchings occur when the pulse width corresponding to 1 bit of the data signal is equal to or shorter than "twice" the sampling period of 125 ps (=250 ps). The boundary of transfer speed is 4.0 Gbps or higher.

As shown at "No. 1" in FIGS. 5A and 5B, three consecutive data switchings occur when the pulse width corresponding to 2 bits of the data signal is shorter than "three times" the sampling period of 125 ps (=375 ps) and the pulse width of 1 bits of the data signal is 187.5 ps (=375 ps/2). Therefore, the boundary of transfer speed is 5.33 Gbps or higher.

Similarly, four consecutive data switchings occur when the pulse width corresponding to 3 bits of the data signal is shorter than "four times" the sampling period, and five consecutive data switchings occur when the pulse width corresponding to 4 bits of the data signal is shorter than "five times" the sampling period. In the case of four consecutive switchings, the pulse width of 1 bit of the data signal is 166.7 ps (=4×125 ps/3) or shorter and the boundary of transfer speed is 6 Gbps or higher. In the case of five consecutive switchings, the pulse width of 1 bit of the data signal is 156.3 ps (=5×125 ps/4) or shorter and the boundary of transfer speed is 6.4 Gbps or higher.

For example, on the assumption that PCI Express Gen3 is used, in order to discriminate the three levels of 2.5 Gbps, 5.0 Gbps and 8.0 Gbps, two threshold values for two consecutive switchings and three consecutive switchings may be provided, as can be seen from FIG. 5B (in some cases, four consecutive switchings and five consecutive switchings or the like may be used). However, by providing more threshold values for the number of consecutive switchings, it is possible to discriminate transfer speeds of data signals based not only on PCI Express Gen3 but also on various other communication standards, between 4 Gbps and 8 Gbps with some degree of minuteness. Moreover, by setting the sampling frequency not only at 8 GHz but also at different frequencies, then similarly defining the relation between the number of consecutive switchings and the boundary of transfer speed, and properly setting a threshold value for the number of consecutive switchings on the basis of the relation, it is possible to cope with different frequency ranges than 4 Gbps to 8 Gbps.

Details of Frequency Determining Circuit

Figure 6A:
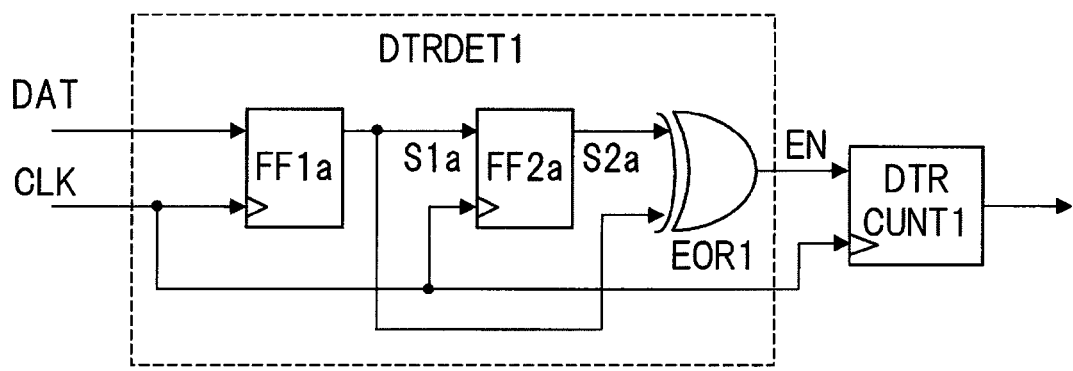
FIG. 6A is a circuit diagram showing an example of the detailed configuration of a switching detection circuit and a counter circuit in the frequency determining circuit of FIG. 3.

FIG. 6A is a circuit diagram showing an example of the detailed configuration of the switching detection circuit and the counter circuit in the frequency determining circuit of FIG. 3. A switching detection circuit DTRDET1 shown in FIG. 6A has two-stage flip-flop circuits FF1a, FF2a and an exclusive logical sum circuit EOR1. The first-stage FF1a latches a data signal DAT at the rising edge of a clock signal (sampling clock signal) CLK. The second-stage FF2a latches an output signal from FF1a at the rising edge of CLK. CLK is generated by the clock generating circuit PLL of FIG. 3. EOR1 outputs '1' as an enable signal EN if an output signal S1a from FF1a and an output signal S2a from FF2a are different from each other.

Figure 6B:
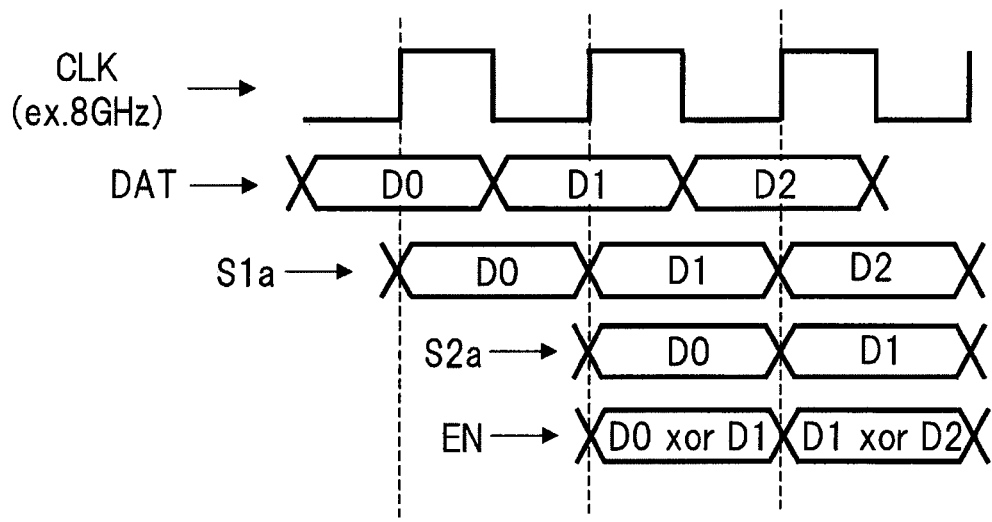
FIG. 6B is a waveform showing the example of operation of FIG. 6A.

FIG. 6B is a waveform showing the example of operation of FIG. 6A. As such a circuit configuration is used, for example, with the frequency of the clock signal CLK being 8 GHz, for example, 8-GHz data signals D0, D1, D2, . . . are sequentially latched by the flip-flop circuits FF1a, FF2a with a sampling frequency of 8 GHz, as shown in FIG. 6B. Using the result of this latching, the exclusive logical sum circuit EOR1 sequentially determines a match or no match between two consecutive data signals (for example, D0 and D1, D1 and D2, and the like), and outputs '1' as an enable signal EN in the case of no match (that is, if there is a data switching).

A counter circuit DTRCUNT1 of FIG. 6A increase the count value of the clock signal CLK during a period when the enable signal EN is '1', and finalizes and resets the count value when EN becomes '0'. Thus, for example, if two consecutive data switchings occur, DTRCUNT1 outputs a counter value '2' to the discrimination circuit RJDG of FIG. 3. Such an operation is carried out for a predetermined period, and during this period, DTRCUNT1 sequentially outputs the finalized count value to RJDG. After this predetermined period, RJDG recognizes the maximum value of the count values outputted from DTRCUNT1 and thereby determines the frequency.

As described above, using the semiconductor device and the information processing system according to Embodiment 1, plural transfer speeds can be determined with a small-scale circuit, for example, as can be seen from FIGS. 3 and 6A or the like. Also, the small circuit scale enables a reduction in power consumption. Moreover, as described with reference to FIGS. 4, 5A and 5B, for example, even if three or more types of transfer speeds exist, these transfer speeds can be discriminated regardless of communication standards.

As a comparative example, for example, in a method in which a logic circuit is provided which identifies the communication format defined by the communication protocol, an increase in circuit scale and power consumption may occur and frequencies that can be discriminated may be significantly limited. Also, in the method as disclosed in JP-A-2012-156676, it may be difficult to discriminate transfer speeds if there are three or more types of transfer speeds. In the method as disclosed in JP-A-2005-20308, a sampling clock signal that largely exceeds 8 GHz is required, making implementation difficult.

Embodiment 2

In Embodiment 2 of the invention, a modification of the frequency determining circuit described with reference to FIGS. 6A and 6B of Embodiment 1 will be described.

Details of Frequency Determining Circuit (Modification)

Figure 7A:
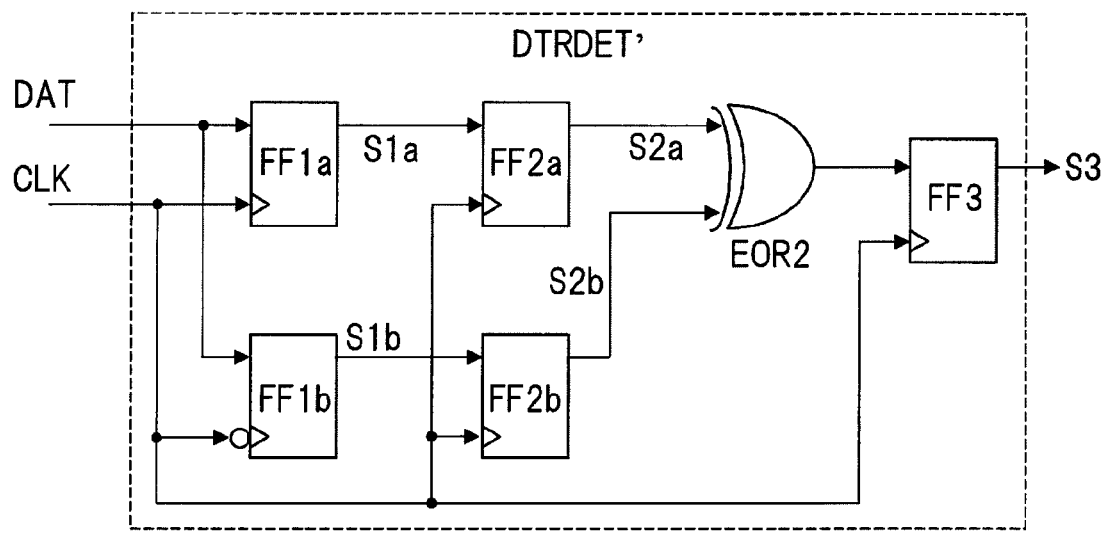
FIG. 7A is a circuit diagram showing an example of the basic configuration of the switching detection circuit of FIG. 3 in a semiconductor device according to Embodiment 2 of the invention.

FIG. 7A is a circuit diagram showing an example of the basic configuration of the switching detection circuit of FIG. 3 in a semiconductor device according to Embodiment 2 of the invention. A switching detection circuit DTRDET' shown in FIG. 7A has two-stage flip-flop circuits FF1a, FF2a, two-stage flip-flop circuits FF1b, FF2b, an exclusive logical sum circuit EOR2, and a flip-flop circuit FF3.

The first-stage flip-flop circuit FF1a latches a data signal DAT at the rising edge of a clock signal (sampling clock signal) CLK. The second-stage flip-flop circuit FF2a latches an output signal Sia from FF1a at the rising edge of CLK. CLK is generated by the clock generating circuit PLL of FIG. 3. Meanwhile, the first-stage flip-flop circuit FF1b latches DAT at the falling edge of the clock signal CLK. The second-stage flip-flop circuit FF2b latches an output signal Sib from FF1b at the rising edge of CLK. The exclusive logical sum circuit EOR2 outputs '1' if an output signals S2a from FF2a and an output signal S2b from FF2b are different from each other. FF3 latches an output signal from EOR2 at the rising edge of CLK.

Figure 7B:
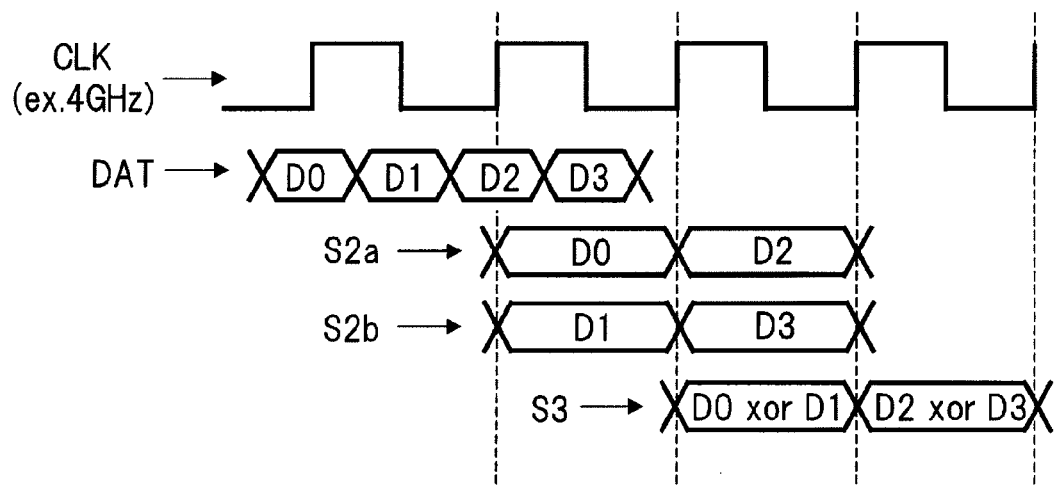
FIG. 7B is a waveform showing the example of operation of FIG. 7A.

FIG. 7B is a waveform showing the example of operation of FIG. 7A. As such a circuit configuration is used, for example, with the frequency of the clock signal CLK being 4 GHz, 8-GHz data signals D0, D1, D2, D3, . . . are sequentially latched at both edges, as shown in FIG. 7B. Here, D0, D2, . . . of the data signals are latched at the rising edge of CLK by the flip-flop circuit FF2a, and D1, D3, . . . are latched at the rising edge of CLK by the flip-flop circuit FF2b. The exclusive logical sum circuit EOR2 sequentially determines a match or no match between two consecutive data signals (for example, D0 and D1, D2 and D3, and the like), and outputs '1' as an output signal S3 from the flip-flop circuit FF3 in the case of no match (that is, if there is a data switching).

Since the data signal is latched (sampled) at both edges of the clock signal CLK, the frequency of CLK can be halved, compared with the case of FIGS. 6A and 6B. Therefore, a further reduction in power consumption can be realized. However, the circuit configuration of FIG. 7A is to discriminate the presence or absence of a switching in terms of D0 and D1, D2 and D3, and the like, of the consecutive data signals D0, D1, D2, D3, Therefore, in practice, this circuit configuration needs to be used in combination with a circuit for discriminating the presence or absence of a switching in terms of in-between units of D1 and D2, and the like, This circuit can be realized, for example, by changing the flip-flop circuits FF2a, FF2b in FIG. 7A to operates at the falling edge of the clock signal CLK. In this case, for example, flip-flop circuits operating at the falling edge may be provided parallel to FF2a, FF2b of FIG. 7A, and an exclusive logical sum circuit and a flip-flop circuit similar to EOR2 and FF3 of FIG. 7A may be provided accordingly. Other than such a configuration, for example, a circuit as shown in FIG. 8A or the like may also be used.

Figure 8A:
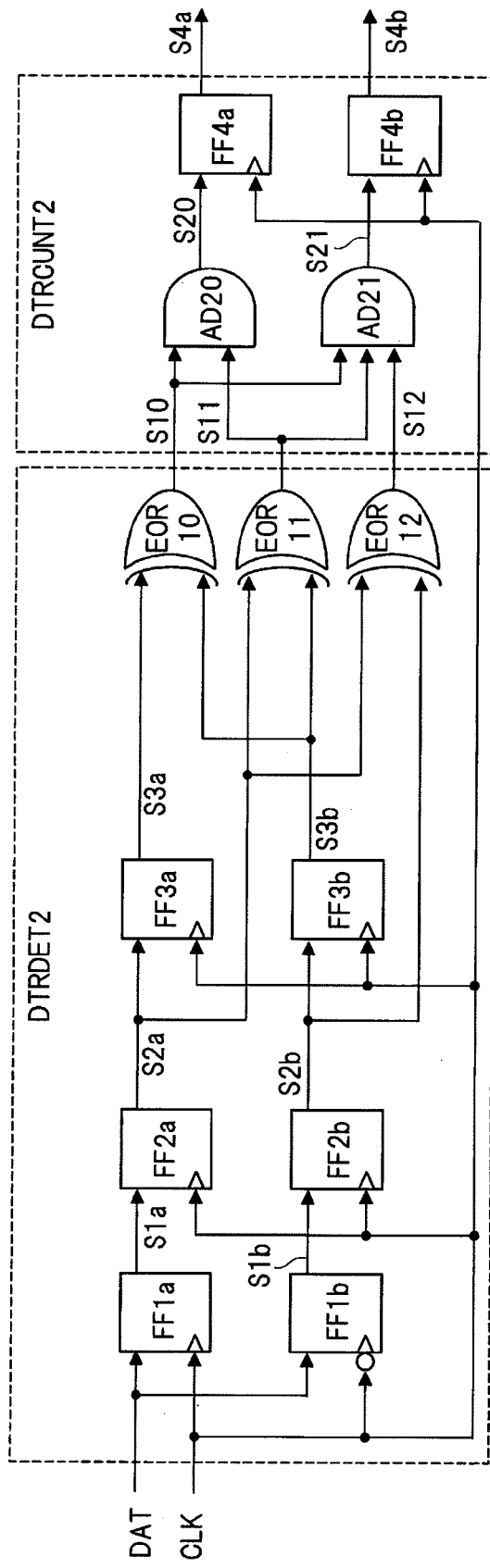
FIG. 8A is a circuit diagram showing an example of the detailed configuration of the switching detection circuit and the counter circuit of FIG. 3 in the semiconductor device according to Embodiment 2 of the invention.

FIG. 8A is a circuit diagram showing an example of the detailed configuration of the switching detection circuit and the counter circuit in the semiconductor device according to Embodiment 2 of the invention. A switching detection circuit DTRDET2 shown in FIG. 8A has three-stage flip-flop circuits FF1a, FF2a, FF3a, three-stage flip-flop circuits FF1b, FF2b, FF3b, and exclusive logical sum circuits EOR10, EOR11, EOR12.

All of the three-stage flip-flop circuits FF1a, FF2a, FF3a perform latching at the rising edge of a clock signal CLK. FF1a latches a data signal DAT. FF2a latches an output signal S1a from FF1a. FF3a latches an output signal S2a from FF2a. Meanwhile, of the three-stage flip-flop circuits FF1b, FF2b and FF3b, FF1b performs latching at the falling edge of CLK, whereas FF2b and FF3b perform latching at the rising edge of CLK. FF1b latches DAT. FF2b latches an output signal S1b from FF1b. FF3b latches an output signal S2b from FF2b.

The exclusive logical sum circuit EOR10 outputs '1' as an output signal S10 if output signals S1a, S1b from the flip-flop circuits FF3a, FF3b are different from each other. The exclusive logical sum circuit EOR11 outputs '1' as an output signal S11 if the output signals S2a, Sib from the flip-flop circuits FF2a, FF3b are different from each other. The exclusive logical sum circuit EOR12 outputs '1' as an output signal S12 if the output signals S2a, S2b from the flip-flop circuits FF2a, FF2b are different from each other.

A counter circuit DTRCUNT2 shown in FIG. 8A has AND calculation circuits AD20, AD21, and flip-flop circuits FF4a, FF4b. AD20 carries out AND calculation of the output signals S10, S11 from the exclusive logical sum circuits EOR10, EOR11. AD21 carries out AND calculation of the output signals S10, S11, S12 from the exclusive logical sum circuits EOR10, EOR11, EOR12. FF4a latches an output signal S20 from AD20 at the rising edge of the clock signal CLK. FF4b latches an output signal S21 from AD21 at the rising edge of the clock signal CLK.

Figure 8B:
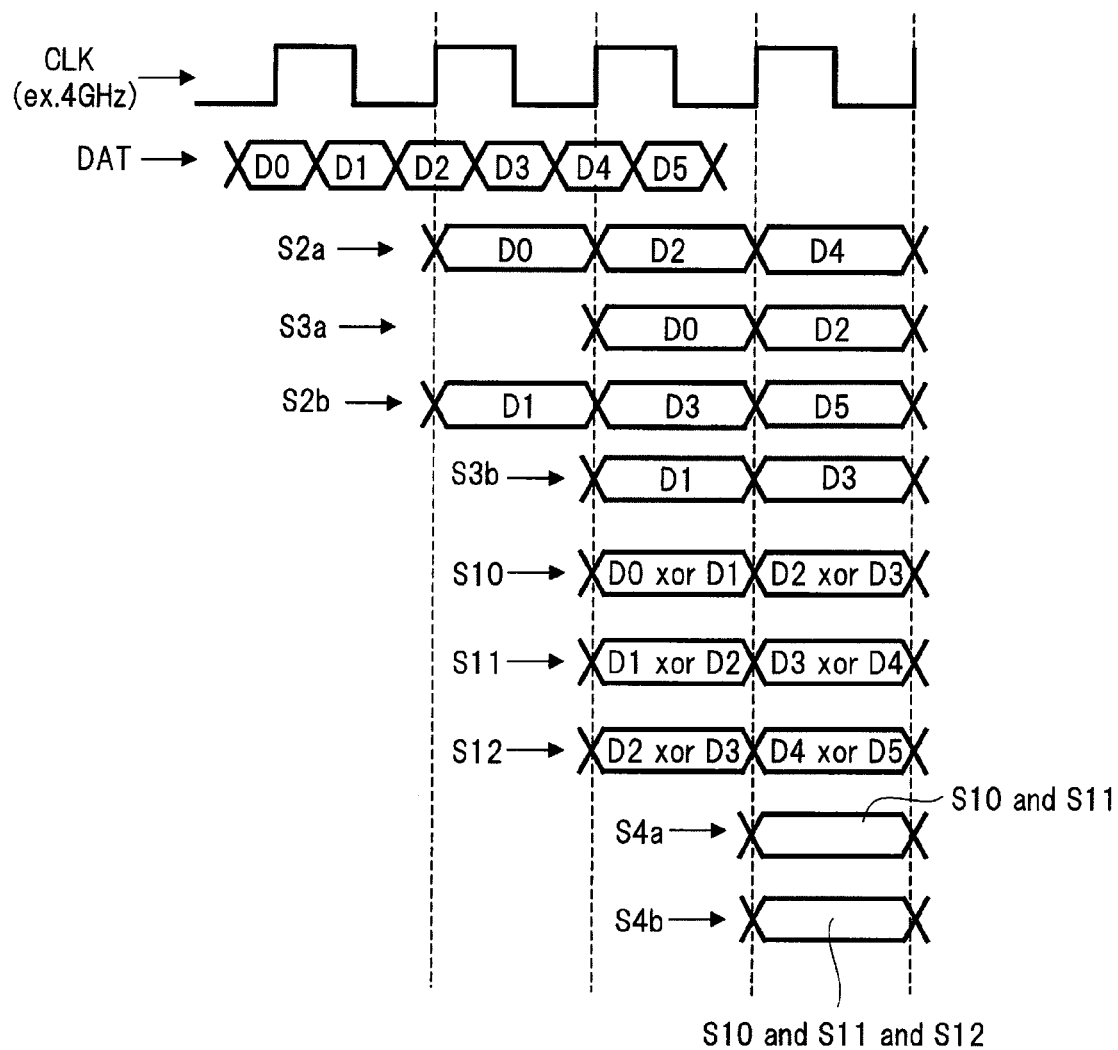
FIG. 8B is a waveform showing the example of operation of FIG. 8A.

FIG. 8B is a waveform showing the example of operation of FIG. 8A. As such a circuit configuration is used, for example, with the frequency of the clock signal CLK being 4 GHz, 8-GHz data signals D0, D1, D2, D3, D4, D5, . . . are sequentially latched at both edges of the clock signal, as shown in FIG. 8B. For example, in a clock cycle where D0 corresponding to the rising edge of CLK is outputted as the output signal S3a, D1 corresponding to the next falling edge is outputted as the output signal S3b, D2 that is one cycle after D0 is outputted as the output signal S2a, and D3 one cycle after D1 is outputted as the output signal S2b.

Therefore, in this clock cycle, the exclusive logical sum circuit EOR10 determines whether the data signals D0 and D1 match or not (S10). The exclusive logical sum circuit EOR11 determines whether the data signals D1 and D2 match or not (S11). The exclusive logical sum circuit EOR12 determines whether the data signals D2 and D3 match or not (S12). Thus, the presence or absence of a data switching can be detected in each of three pairs of consecutive data signals (D0 and D1, D1 and D2, D2 and D3), of four consecutive data signals (for example, D0 to D3), and an occurrence of three consecutive data switchings at maximum can be detected.

If, for example, a data switching occurs between the data signals D0 and D1 and another data switching occurs between the data signals D1 and D2, both the exclusive logical sum circuits EOR10, EOR11 output '1'. As a result, at the counter circuit DTRCUNT2, the output signal S20 from the AND calculation circuit AD20 is '1' and latched by the flip-flop circuit FF4a. That is, if the output signal S4a from FF4a is '1', it means that there is an occurrence of two or more consecutive data switchings.

If a data switching occurs between the data signals D2 and D3 in addition to between the data signals D0 and D1 and between D1 and D2, all of the exclusive logical sum circuits EOR10, EOR11, EOR12 output '1'. As a result, at the counter circuit DTRCUNT2, the output signal S21 from the AND calculation circuit AD21 is '1' and latched by the flip-flop circuit FF4b. That is, if the output signal S4b from FF4b is '1', it means that there is an occurrence of three or more consecutive data switchings.

In this way, the counter circuit DTRCUNT2 has, in essence, the function of counting how many times a switching detected by the switching detection circuit DTRDET2 occurs consecutively. Using the PCI Express standard as an example, the discrimination circuit RJDG of FIG. 3 receives the output signals S4a, S4b from DTRCUNT2, and determines that the transfer speed is 8.0 Gbps if S4b is '1', 5.0 Gbps if S4a= '1' and S4b= '0' hold, and 2.5 Gbps if S4a=S4b= '0' holds.

As described above, using the semiconductor device and the information processing system of Embodiment 2, the frequency of the clock signal (sampling clock signal) CLK can be set low, thus enabling a reduction in power consumption or the like, in addition to the various advantageous effects described in Embodiment 1. It should be understood that the semiconductor device and the information processing system of Embodiment 2 is not necessarily limited to the circuits described with reference to FIGS. 7A and 8A and can be suitably modified as long as both edges (rising edge and falling edge) of CLK are used.

Embodiment 3

In Embodiment 3, details of the signal conditioner device SC1 described with reference to FIG. 2 in Embodiment 1 will be described.

Details of Signal Conditioner Device (Semiconductor Device) [1a]

FIG. 9A is a block diagram showing an example of the detailed configuration of the signal conditioner device of FIG. 2 in a semiconductor device according to Embodiment 3 of the invention. A signal conditioner device (semiconductor device) SC1a of FIG. 9A is configured mainly by adding a waveform shaping control circuit WVOCTL to the signal conditioner device SC1 of FIG. 2. WVOCTL has a selection circuit SELo that selects from plural predetermined tap coefficients TAP1 to TAP4. SELo selects one of TAP1 to TAP4, based on the result of determination by the frequency determining circuit FJDGU, and sets the selected tap coefficient to the driver circuit DRV.

Figure 9B:
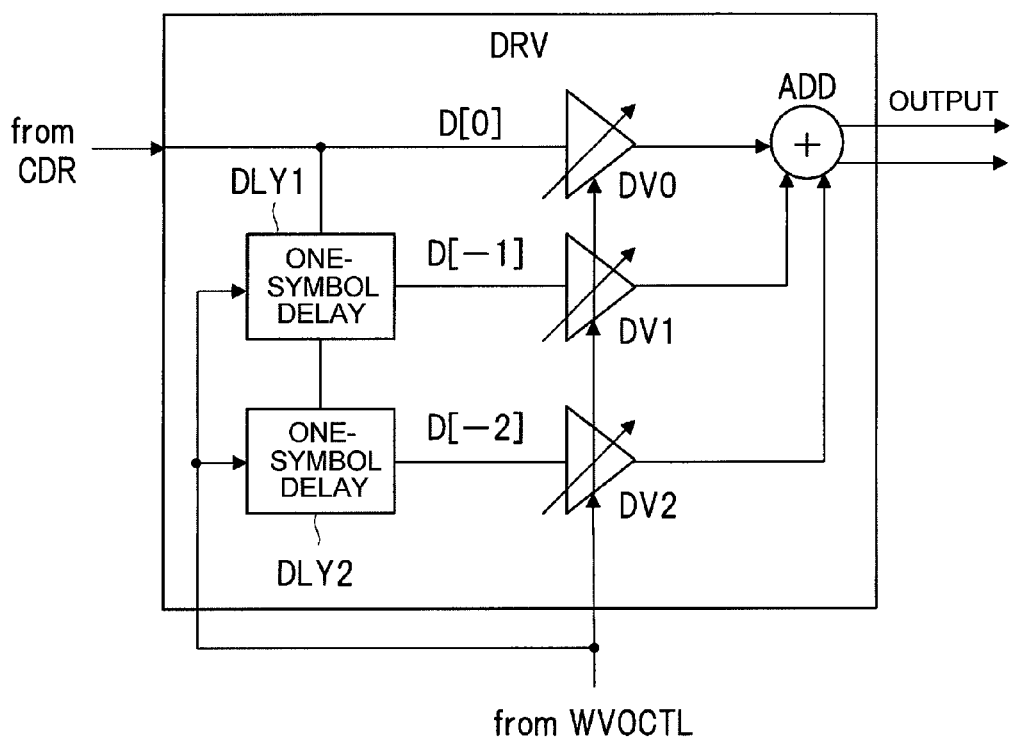
FIG. 9B is a block diagram showing an example of the detailed configuration of a driver circuit of FIG. 9A.

FIG. 9B is a block diagram showing an example of the detailed configuration of the driver circuit in FIG. 9A. The driver circuit shown in FIG. 9B has plural (in this example, three) sub-driver circuits DV0 to DV2, one-symbol delay circuits DLY1, DLY2, and an adding circuit ADD. DLY1 delays, by one symbol, a reproduced data signal D[0] from a clock data reproducing circuit CDR and outputs a data signal D[−1]. DLY2 delays, by one symbol, the data signal D[−1] outputted from DLY1 and outputs a data signal D[−2].

The sub-driver circuits DV0, DV1, DV2 respectively amplify the data signal D[0], D[−1], D[−2] with a predetermined gain. The adding circuit ADD adds output signals from DV0, DV1, DV2 and generates a final output signal. Here, the respective gains at DV0, DV1, DV2 and the amounts of delay at the one-symbol delay circuits DLY1, DLY2 are set, using the tap coefficients from the waveform shaping control circuit WVOCTL of FIG. 9A.

The driver circuit DRV as shown in FIG. 9B includes a waveform equalization function called FFE (feed forward equalizer) or the like. As data communication becomes high-speed, intersymbol interference called ISI occurs and the waveform shape of the present symbol changes according to the data values of the previous symbol and the symbol before the previous symbol or the like. As a result, the waveform shape at the receiving end (for example, the transmitter-receiver device TRX2 of FIG. 1) may be disrupted, causing circumstances where data cannot be discriminated correctly.

Thus, as shown in FIG. 9B, the driver circuit DRV performs predetermined weighting on the data value of the previous symbol (D[−1]) and the data value of the symbol before the previous symbol (D[−2]) with the gains of the sub-driver circuits DV1, DV2 and then adds the weighted data values to the data value of the present symbol (D[0]), thus performing waveform equalization. That is, in order to obtained the correct waveform shape at the receiving end (for example, the transmitter-receiver device TRX2 of FIG. 1) even if intersymbol interference occurs, the waveform shape is shaped in advance in anticipation of the amount of change in the waveform shape due to the intersymbol interference.

However, the degree of intersymbol interference varies depending on the transfer speed of the data signal. Also, the amounts of delay by the one-symbol delay circuits DLY1, DLY2 vary depending on the transfer speed. Thus, in the waveform shaping control circuit WVOCTL of FIG. 9A, an optimum combination of the amount of delay by DLY1, DLY2 and the gain of each sub-driver circuit DV0, DV1, DV2 is preset for each transfer speed, as the tap coefficients TAP1 to TAP4. WVOCTL selects a proper tap coefficient from these, based on the result of determination by the frequency determining circuit FJDGU. The driver circuit DRV performs waveform shaping on the reproduced data signal D[0] from the clock data reproducing circuit CDR, using the amount of waveform equalization based on the tap coefficient, and then transmits the resulting data signal to the receiving end.

Details of Signal Conditioner Device (Semiconductor Device) [1b]

Figure 10A:
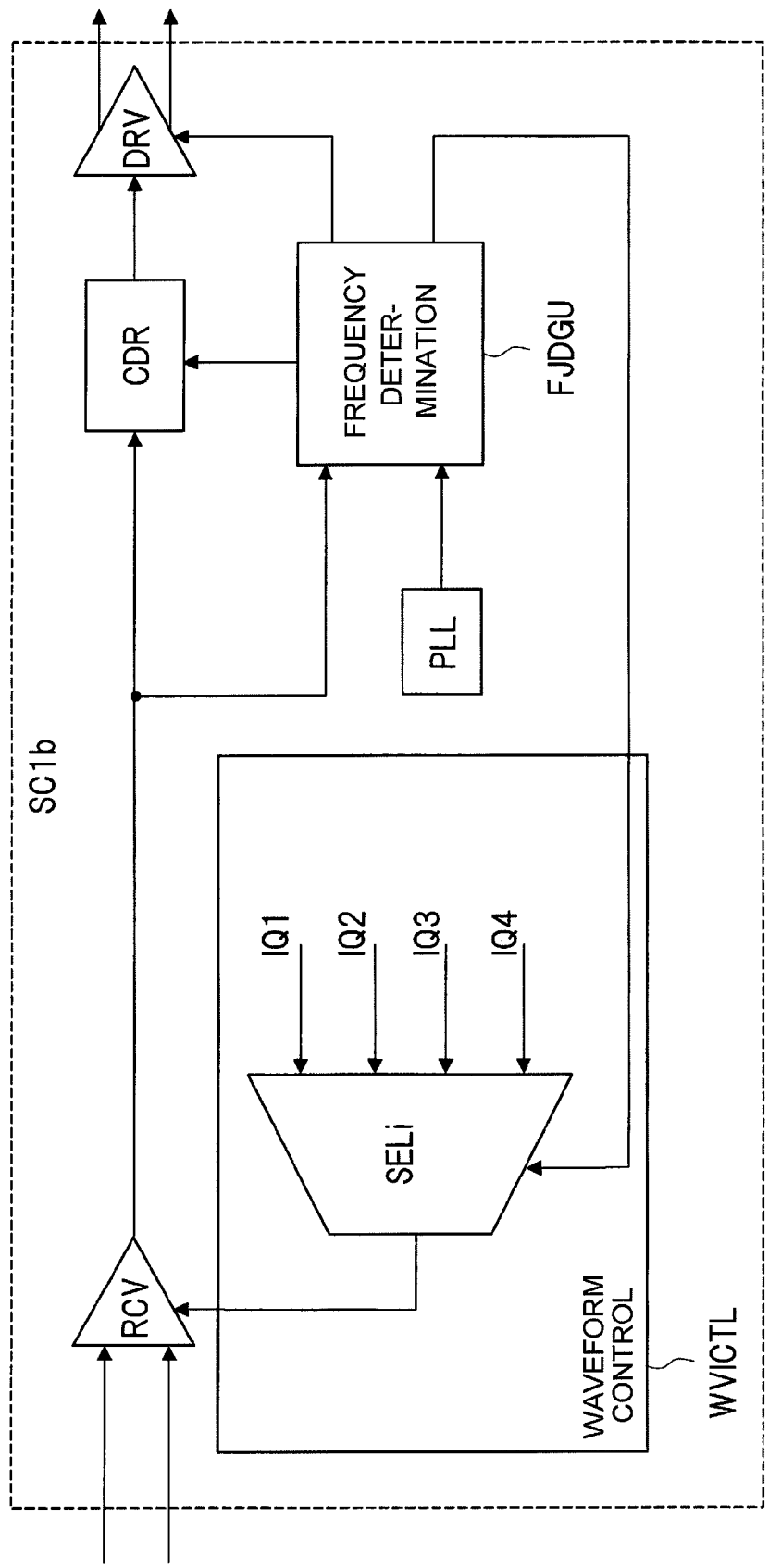
FIG. 10A is a block diagram showing another example of the detailed configuration of the signal conditioner device of FIG. 2 in the semiconductor device according to Embodiment 3 of the invention.

FIG. 10A is a block diagram showing another example of the detailed configuration of the signal conditioner device of FIG. 2 in the semiconductor device according to Embodiment of the invention. A signal conditioner device (semiconductor device) SC1b of FIG. 10A is configured mainly by adding a waveform shaping control circuit WVICTL to the signal conditioner device SC1 of FIG. 2. WVICTL has a selection circuit SELi that selects from plural predetermined equalization coefficients IQ1 to IQ4. SELi selects one of IQ1 to IQ4, based on the result of determination by the frequency determining circuit FJDGU, and sets the selected equalization coefficient to the receiver circuit RCV.

Figure 10B:
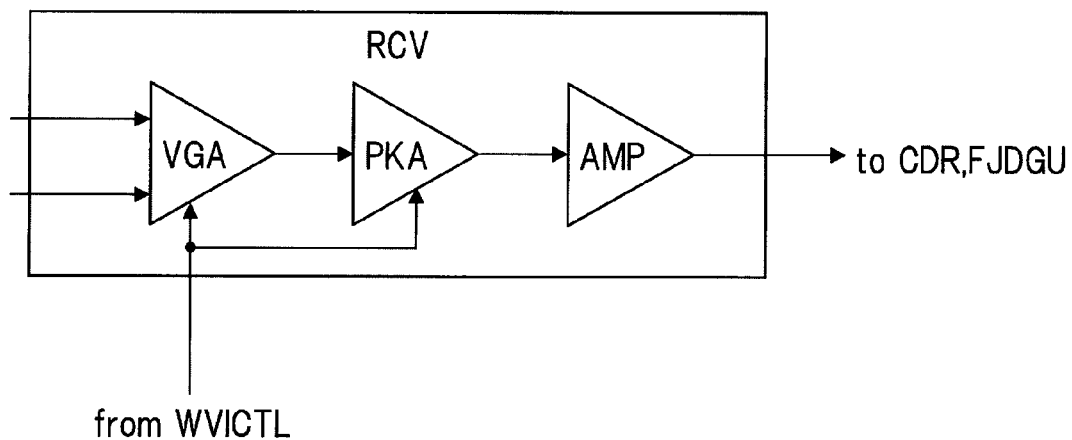
FIG. 10B is a block diagram showing an example of the detailed configuration of a receiver circuit of FIG. 10A.

FIG. 10B is a block diagram showing an example of the detailed configuration of the receiver circuit in FIG. 10A. The receiver circuit shown in FIG. 10B has a variable gain amplifier circuit VGA, a peaking amplifier circuit PKA arranged subsequently to VGA, and an amplifier circuit AMP arranged subsequently to PKA. VGA receives a data signal from the transmitting end (for example, the transmitter-receiver device TRX1 of FIG. 1) and amplifies the received data signal with a predetermined gain. PKA amplifies mainly a predetermined frequency range of an output signal from VGA. AMP amplifies an output signal from PKA and outputs the amplified signal to the clock data reproducing circuit CDR and the frequency determining circuit FJDGU. Here, the gain of VGA and the amount of peaking of PKA are set, using the equalization coefficients from the waveform shaping control circuit WVICTL of FIG. 10A.

Figure 10C:
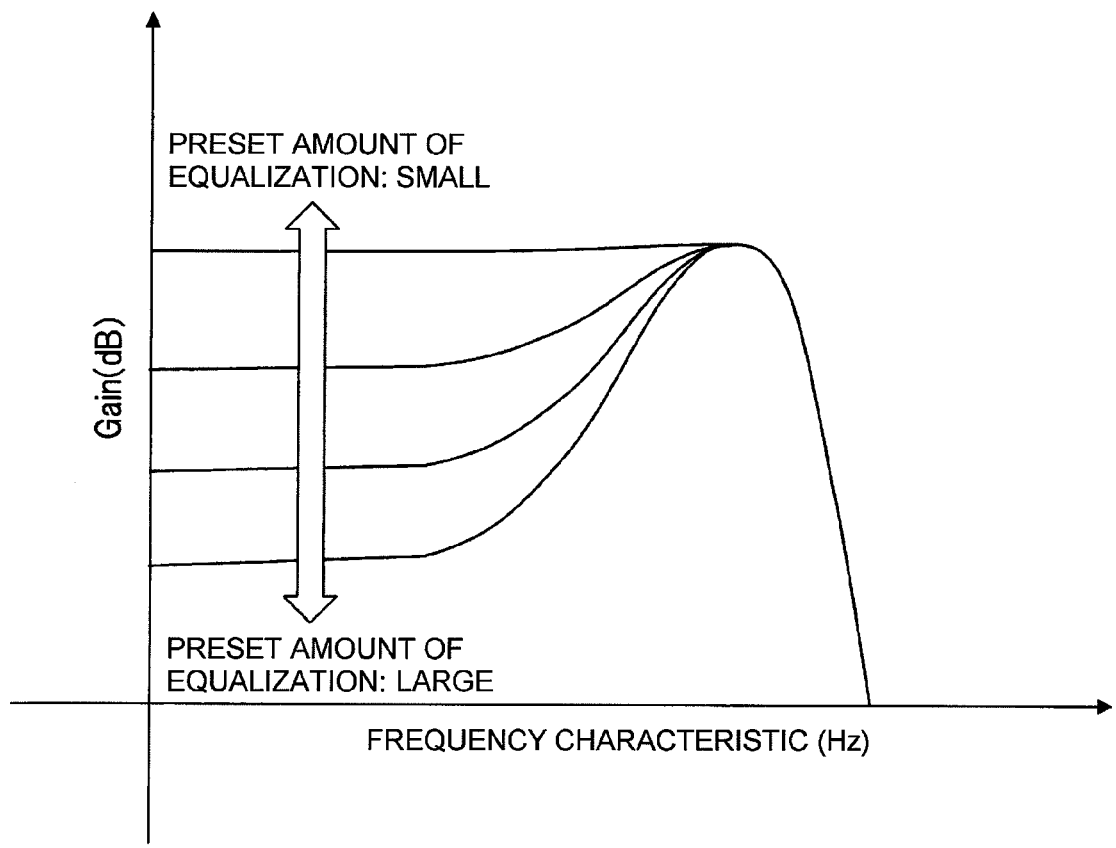
FIG. 10C shows an example of the frequency-gain characteristic of a peaking amplifier circuit of FIG. 10B.

FIG. 10C shows an example of the frequency-gain characteristic of the peaking amplifier circuit of FIG. 10B. The variable gain amplifier circuit VGA shown in FIG. 10B amplifies a received data signal with a predetermined gain. However, such an amplifier circuit usually has such a characteristic that the gain falls particularly in a high frequency range. Also, the transmission line LN from the transmitter-receiver device TRX1 to the signal conditioner device SC, as shown in FIG. 1, usually has a low-pass filter characteristic such that the amount of attenuation in the high frequency range increases particularly as LN becomes longer.

If the gain (amount of attenuation) thus changes depending on frequency ranges, the waveform shape may be disrupted, making it difficult to reproduce a data signal and a clock signal correctly at the clock data reproducing circuit CDR, for example. Thus, by using the peaking amplifier circuit PKA that amplifies mainly mid to high frequency ranges, as shown in FIG. 10C, it is possible to compensate for the fall in the gain (increase in the amount of attenuation) in the mid to high frequency ranges and realize a flat frequency characteristic over a broad range.

In this case, since the size of the frequency component included in a data signal varies depending on the transfer speed of the data signal, the amount of compensation (amount of equalization) in the mid to high frequency ranges needs to be changed. Also, in practice, the balance between the gain of the variable gain amplifier circuit VGA, which mainly targets low to mid frequency ranges, and the amount of equalization of the peaking amplifier circuit PKA, which mainly targets mid to high frequency ranges, needs to be adjusted in order to realize a flat frequency characteristic over a broad range in response to the transfer speed of the data signal.

Thus, in the waveform shaping control circuit WVICTL of FIG. 10A, an optimum combination of the gain of the variable gain amplifier circuit VGA and the amount of equalization of the peaking amplifier circuit PKA is preset for each transfer speed, as the equalization coefficients IQ1 to IQ4. WVICTL selects a proper equalization coefficient from these, based on the result of determination by the frequency determining circuit FJDGU. The receiver circuit RCV performs waveform shaping on the data signal received from the transmitting end, based on the equalization coefficient, and then outputs the resulting data signal to the clock data reproducing circuit CDR or the like.

As described above, using the semiconductor device and the information processing system of Embodiment 3, proper waveform shaping corresponding to the transfer speed can be carried out even if the transfer speed changes in the course of data communication between the transmitter-receiver device TRX1 and the transmitter-receiver device TRX2 of FIG. 1, in addition to the various advantageous effects described in Embodiments 1 and 2. As a result, in the information processing system of FIG. 1, highly reliable data communication can be realized between TRX1 and TRX2. While it is desirable that the signal conditioner device has both the driver circuit described with reference to FIGS. 9A and 9B and the receiver circuit described with reference to FIGS. 10A and 10B, the signal conditioner device may be configured to have only one of these circuits, depending on circumstances.

Embodiment 4

In Embodiment 4, an application example of the signal conditioner device SC1 shown in FIG. 2 of Embodiment 1 will be described.
Outline of Signal Conditioner Device (Semiconductor Device) (Application Example)

Figure 11:
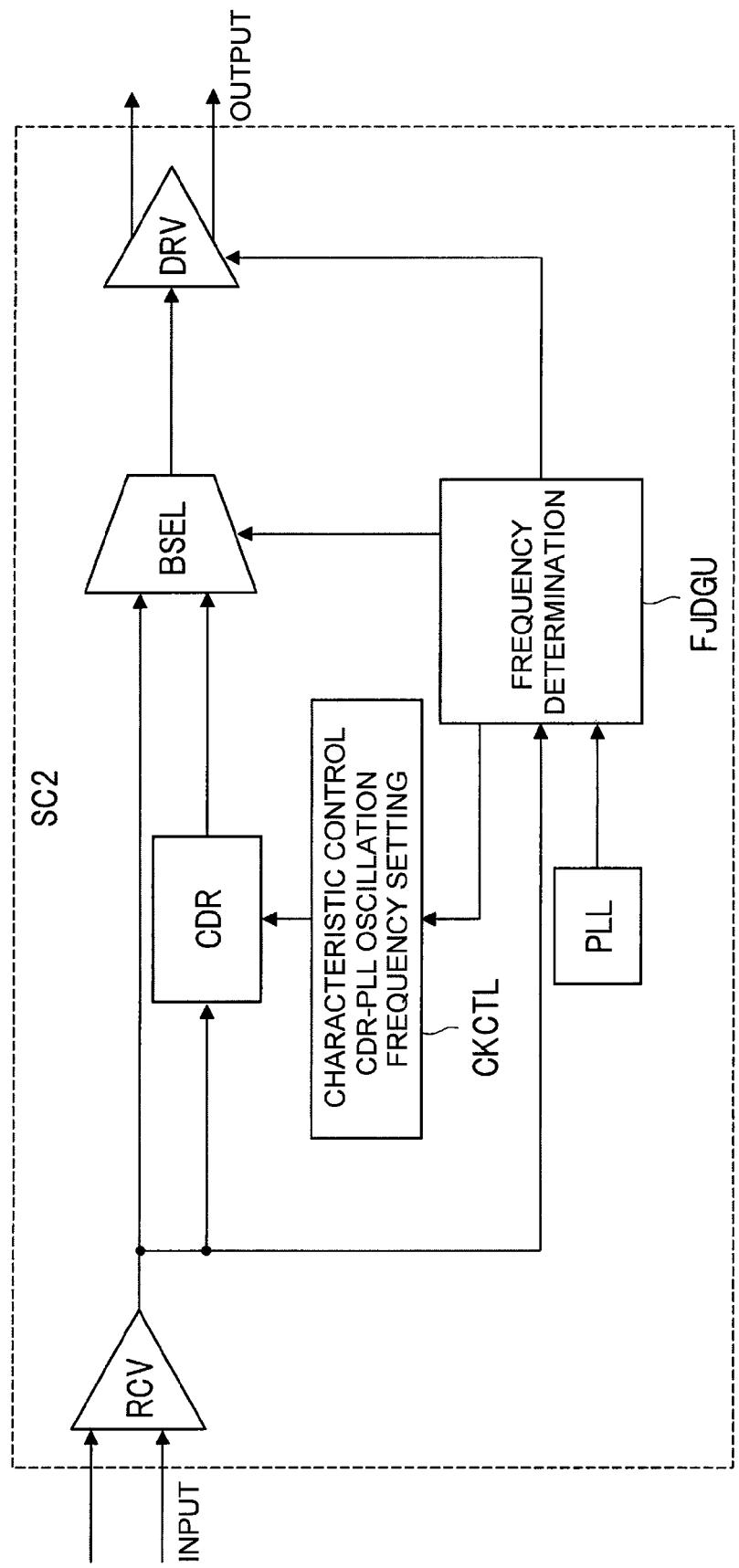
FIG. 11 is a block diagram showing an example of the schematic configuration of a main portion of the signal conditioner device of FIG. 1 in the semiconductor device according to Embodiment 3 of the invention.

FIG. 11 is a block diagram showing an example of the schematic configuration of a main portion of the signal conditioner device of FIG. 1 in the semiconductor device according to Embodiment 3 of the invention. A signal conditioner device SC2 of FIG. 11 is configured by further adding a selection circuit BSEL and a CDR clock control circuit CKCTL to the signal conditioner device SC1 of FIG. 2. BSEL selects and outputs either a data signal reproduced by the clock data reproducing circuit CDR or a data signal outputted from the receiver circuit RCV, to the driver circuit DRV.

The CDR clock control circuit CKCTL has, for example, a CDR clock generating circuit (CDR-PPL) therein, and controls the frequency of a CDR clock signal generated by this clock generating circuit, based on the result of determination by the frequency determining circuit FJDGU. The clock data reproducing circuit CDR causes its own internal circuit to operate based on the CDR clock signal generated by CKCTL and reproduces the data signal and the clock signal. That is, CDR operates with the frequency based on the result of determination by FJDGU.

Here, the selection circuit BSEL selects the data signal outputted from the receiver circuit RCV (that is, bypass route) until the result of determination by the frequency determining circuit FJDGU is finalized. The selection circuit BSEL selects the data signal reproduced by CDR (that is, CDR route) when the result of determination by FJDGU is finalized and the operation of the clock data reproducing circuit CDR is stabilized. For example, if the transfer speed of the data signal is changed in the course of data communication, FJDGU detects this change in the transfer speed, based on the change in the number of consecutive data switchings, then causes BSEL to select the bypass route, and designates a frequency to the CDR clock control circuit CKCTL.

After that, with the lapse of a predetermined waiting time until the operation of the clock data reproducing circuit CDR is stabilized, the frequency determining circuit FJDGU causes the selection circuit BSEL to select the CDR route. During the waiting time, the CDR clock control circuit CKCTL generates a CDR clock signal having the designated frequency and supplies the CDR clock signal to the clock data reproducing circuit CDR. CDR causes its internal circuit to operate with the clock signal, and shifts toward a stationary state where the correct reproducing operation is possible, for example, while adjusting the phase or the like of the clock signal. The waiting time ends when this stationary state is reached. The waiting time can be estimated in advance in the designing stage. FJDGU secures the waiting time with a timer or the like.

By using such a signal conditioner device, it is possible to realize highly reliable data communication, for example, between the transmitter-receiver device TRX1 and the transmitter-receiver device TRX2 of FIG. 1. Specifically, since the operation of the clock data reproducing circuit CDR is unstable for a while after the transfer speed is changed, there is a risk that, in some cases, a signal violating a predetermined communication protocol may be transferred from the signal conditioner device SC of FIG. 1 to TRX2. In such a case, it may be determined that a trouble has occurred in the link between TRX1 and TRX2. Using the signal conditioner device of this Embodiment 4, it is possible to avoid such a circumstance.

Embodiment 5

In Embodiment 5, an application example of the frequency determining circuit FJDGU1 shown in FIG. 3 of Embodiment 1 will be described.
Outline of Frequency Determining Circuit (Application Example)

Figure 12:
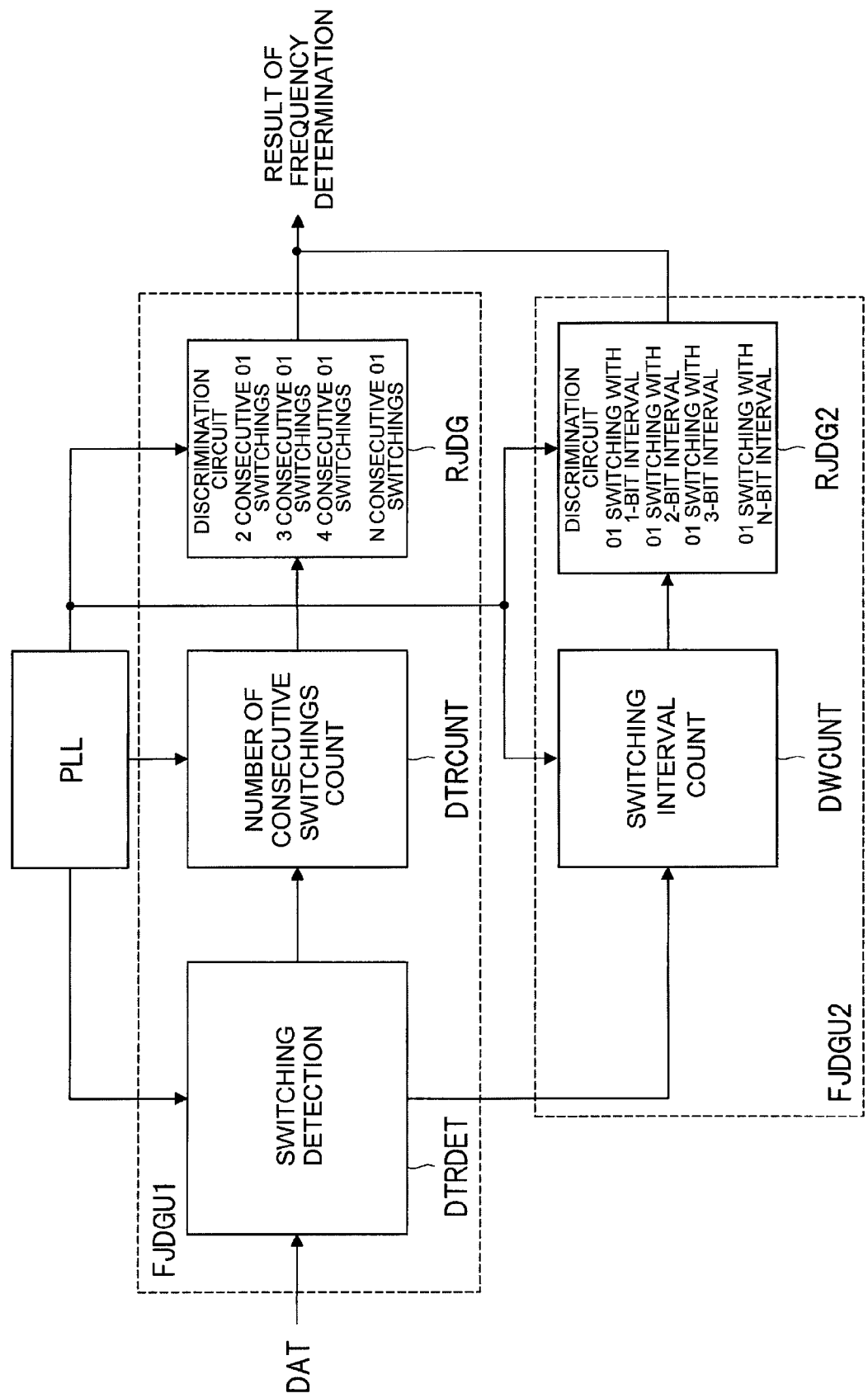
FIG. 12 is a block diagram showing an example of the configuration of a frequency determining circuit in a semiconductor device according to Embodiment 5 of the invention.

FIG. 12 is a block diagram showing an example of the configuration of a frequency determining circuit in a semiconductor device according to Embodiment 5 of the invention. A frequency determining circuit shown in FIG. 12 is configured by adding another frequency determining circuit (second frequency determining circuit) FJDGU2 to the frequency determining circuit (first frequency determining circuit) FJDGU1 shown in FIG. 3. FJDGU2 is different from FJDGU1 detecting the number of consecutive data switchings and is characterized by detecting a minimum interval between data switchings.

Based on plural data latched at plural consecutive timings held by the switching detection circuit DTRDET of FJDGU1, the frequency determining circuit FJDGU2 detects how many of the plural consecutive timings is equivalent to a minimum interval between data switchings, and determines the transfer speed (frequency) of the data signal from the result of the detection. Specifically, FJDGU2 has a counter circuit (second counter circuit) DWCUNT and a discrimination circuit (second discrimination circuit) RJDG2, both of which operate with the clock signal from the clock generating circuit PLL. DWCUNT counts the interval between the switchings detected by DTRDET of FJDGU1. RJDG2 determines the frequency from the minimum count value counted by DWCUNT, based on the relation between the switching interval and frequency associated with each other in advance.

Figures 13A, 13B:
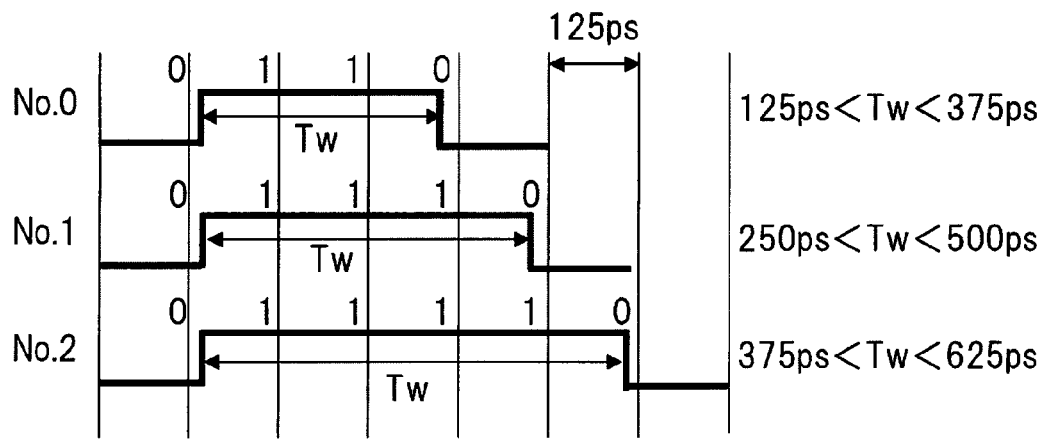
FIG. 13A is an explanatory view showing an example of operation of the frequency determining circuit (second frequency determining circuit) of FIG. 12.
FIG. 13B is an explanatory view showing an example of operation of the frequency determining circuit (second frequency determining circuit) of FIG. 12.

FIGS. 13A and 13B are explanatory views showing the example of operation of the frequency determining circuit (second frequency determining circuit) of FIG. 12. The frequency determining circuit (second frequency determining circuit) FJDGU2 is capable of determining the transfer speed (frequency) of a low-speed data signal having a minimum pulse width that is twice the sampling period or longer. Here, a sampling block of 8 GHz (with a sampling period of 125 ps) is used as an example. For example, if the minimum interval between data switchings is 1 bit as shown at "No. 0" in FIGS. 13A and 13B (that is, if '1' or '0' is counted twice consecutively at minimum), the minimum pulse width Tw of the data signal is within a range from 125 ps to 375 ps. In this case, the transfer speed of the data signal is within a range from 8.0 Gbps to 2.67 Gbps.

Meanwhile, if the minimum interval between data switchings is 2 bits as shown at "No. 1" in FIGS. 13A and 13B (that is, if '1' or '0' is counted three times consecutively at minimum), the minimum pulse width Tw of the data signal is within a range from 250 ps to 500 ps. However, since there is no counting of two consecutive switchings, Tw can be within a range from 375 ps to 500 ps. The transfer speed of the data signal is within a range from 2.67 Gbps to 2.0 Gbps. Also, if the minimum interval between data switchings is 3 bits as shown at "No. 2" in FIGS. 13A and 13B (that is, if '1' or '0' is counted four times consecutively at minimum), the minimum pulse width Tw of the data signal is within a range from 375 ps to 625 ps. However, since there is no counting of three consecutive switchings, Tw can be within a range from 500 ps to 625 ps. The transfer speed of the data signal is within a range from 2.0 Gbps to 1.6 Gbps.

The discrimination circuit RJDG2 of FIG. 12 receives the count values outputted from the counter circuit DWCUNT, recognizes the minimum count value among these count values, and determines the transfer speed (frequency) of the data signal, using the standard described with reference to FIGS. 13A and 13B. The counter circuit DWCUNT carries out the counting operation during a period from detection of a data switching by the switching detection circuit DTRDET to detection of the next switching. DWCUNT may be configured to carry out the counting operation, for example, using a period when the exclusive logical sum circuit EOR1' outputs '0', as an enable signal, in the example of configuration of FIG. 6A, though this configuration is not particularly limiting.

As described above, using the semiconductor device and the information processing system of Embodiment 5, it is possible to discriminate the transfer speed (frequency) of a low-speed data signal, in addition to the various advantageous effects described in Embodiments 1 to 4. Specifically, discrimination in a lower range than (sampling frequency/2) can be done by the second frequency determining circuit FJDGU2, in addition to discrimination within the range from sampling frequency to (sampling frequency/2) by the first frequency determining circuit FJDGU1. As a result, frequencies over a broad frequency range can be determined, enabling the system to flexibly cope with various communication standards. Also, in this case, an increase in circuit scale and power consumption due to the frequency determination can be restrained sufficiently.

Embodiment 6

In Embodiment 6, a modification of the frequency determining circuit FJDGU1 shown in FIG. 3 of Embodiment 1 will be described.
Outline of Frequency Determining Circuit (Modification)

Figure 14:
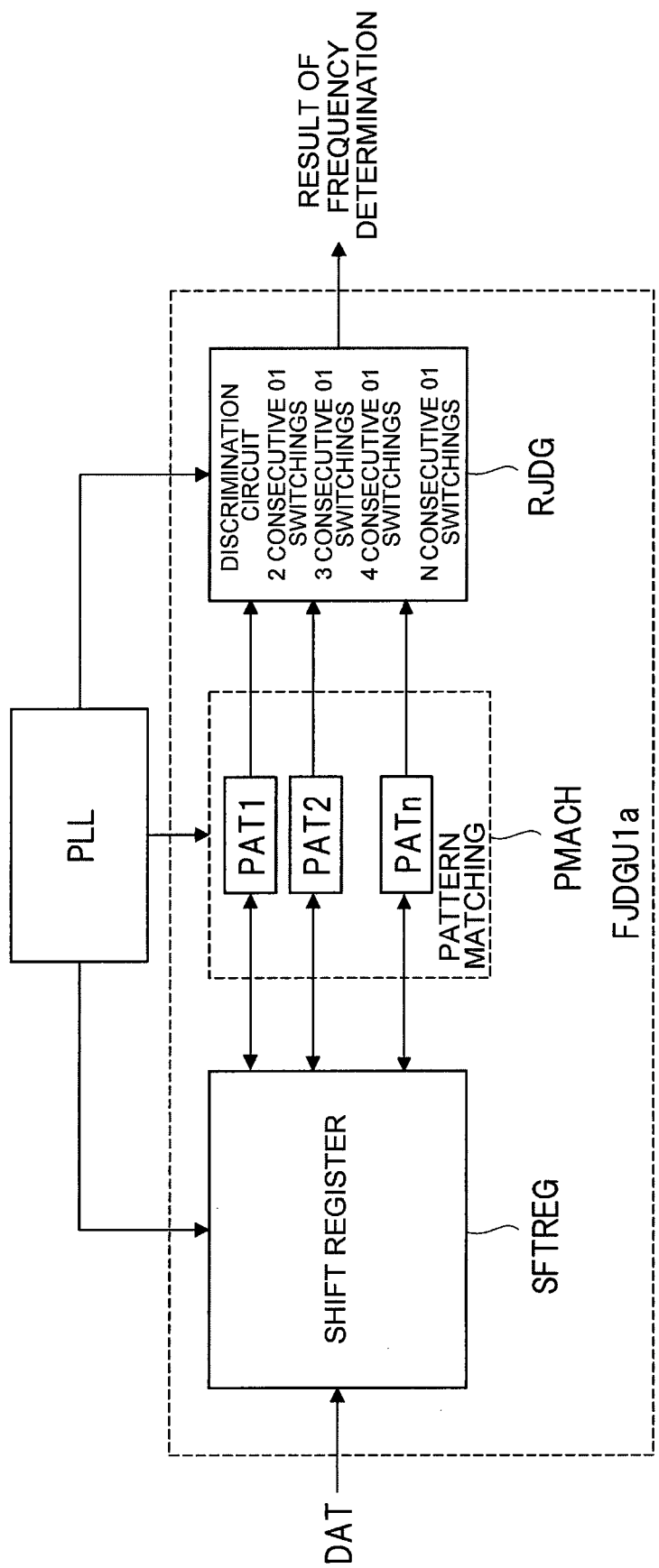
FIG. 14 is a block diagram showing an example of the configuration of a frequency determining circuit in a semiconductor device according to Embodiment 6 of the invention.

FIG. 14 is a block diagram showing an example of the configuration of a frequency determining circuit in a semiconductor device according to Embodiment 6 of the invention. A frequency determining circuit FJDGU1a shown in FIG. 14 has a function of latching a data signal at each of plural timings continuing at a predetermined interval, detecting how many times a data switching occurs consecutively, based on the latched plural data, and determining the transfer speed of the data signal from the result of the detection, as in the case of FIG. 3. However, FJDGU1a is different from the example of FIG. 3 in details of the method for realizing this function.

The frequency determining circuit FJDGU1a of FIG. 14 realizes the functions of the switching detection circuit DTRDET and the counter circuit DTRCUNT shown in FIG. 3, by using a shift register circuit SFTREG and a pattern matching circuit PMACH. In PMACH, for example, a data pattern "010" for two consecutive switchings, a data pattern "0101" for three consecutive switchings and the like, as shown in FIG. 5B, are held in advance as preset patterns PAT1 to PATn.

The pattern matching circuit PMACH compares a data signal latched by the shift register circuit SFTREG having a predetermined bit width, with the respective preset patterns PAT1 to PATn, over every sampling period, and outputs information about match or no match with each preset pattern to the discrimination circuit RJDG. RJDG recognizes the number of consecutive data switchings, based on this information of match or no match, and determines the transfer speed (frequency) of the data signal in a similar manner to Embodiment 1.

Embodiments of the invention made by the inventor are specifically described above. However, the invention is not limited to the embodiments and various changes can be made without departing from the scope of the invention. For example, the above embodiments are described in detail in order to facilitate understanding of the invention, and the invention may not necessarily have all the configurations described above. Also, a part of one embodiment can be replaced with the configuration of another embodiment, and the configuration of one embodiment can be added to the configuration of another embodiment. Moreover, addition, deletion, or replacement with another configuration can be made to a part of the configuration of each embodiment.

For example, while the PCI Express standard is used as an example in the above description, this standard is not limiting and the invention is similarly applicable to various other serial interface standards. Also, while a signal conditioner device is used in the above description as an example of a semiconductor device that carries out frequency determination, this example is not limiting. For example, in a semiconductor device having an ASIC (application specific integrated circuit) or the like with a serial interface, the methods of the embodiments can be applied as the frequency determination function of the serial interface.

What is claimed is:
1. A semiconductor device comprising a first frequency determining circuit that receives a data signal on which plural transfer speeds can be set and that determines a transfer speed of the data signal,
wherein the first frequency determining circuit includes:
a switching detection circuit that detects a data switching, based on plural data signals that are latched at each of plural timings continuing with a predetermined interval;
a first counter circuit that counts how many times the data switching detected by the switching detection circuit occurs consecutively; and
a first discrimination circuit that determines a frequency from a count value counted by the first counter circuit, based on a relation between number of consecutive switchings and frequency associated with each other in advance.

2. The semiconductor device according to claim 1, wherein the first frequency determining circuit generates the plural timings at a rising edge and a falling edge of a clock.

3. The semiconductor device according to claim 1, further comprising:
- a receiver circuit that receives the data signal;
- a clock data reproducing circuit that reproduces a data signal and a clock signal from a data signal outputted from the receiver circuit; and
- a driver circuit that transmits the data signal reproduced by the clock data reproducing circuit.

4. The semiconductor device according to claim 3, wherein the driver circuit performs waveform shaping on the reproduced data signal, using an amount of waveform equalization based on a tap coefficient, and then transmits the data signal, and
- the tap coefficient is changed, based on a result of determination by the first frequency determining circuit.

5. The semiconductor device according to claim 3, wherein the receiver circuit performs waveform shaping on the received data signal, using an amount of equalization based on an equalization coefficient, and then outputs the data signal to the clock data reproducing circuit, and
- the equalization coefficient is changed, based on a result of determination by the first frequency determining circuit.

6. The semiconductor device according to claim 3, further comprising a selection circuit that selects and outputs either the reproduced data signal or the data signal outputted from the receiver circuit, to the driver circuit,
- wherein the clock data reproducing circuit receives a result of determination by the first frequency determining circuit and operates with a frequency based on the result of determination, and
- the selection circuit selects the data signal outputted from the receiver circuit until the result of determination by the first frequency determining circuit is finalized, and the selection circuit selects the reproduced data signal when the result of determination by the first frequency determining circuit is finalized and the operation of the clock data reproducing circuit is stabilized.

7. The semiconductor device according to claim 1, further comprising a second frequency determining circuit that detects how many of the continuing plural timings is equivalent to a minimum interval between data switchings, based on the latched plural data signals, and determines the transfer speed of the data signal from the result of the detection.

8. The semiconductor device according to claim 7, wherein the first frequency determining circuit includes a switching detection circuit that detects a data switching, based on the latched plural data signals, and
the second frequency determining circuit includes:
- a second counter circuit that counts an interval between the switchings detected by the switching detection circuit of the first frequency determining circuit; and
- a second discrimination circuit that determines a frequency from a minimum count value counted by the second counter circuit, based on a relation between switching interval and frequency associated with each other in advance.

9. An information processing system comprising:
a transmission line;
a first semiconductor device that sends out a data signal on which plural transfer speeds can be set, to the transmission line;
a second semiconductor device that receives the data signal transmitted via the transmission line; and
a third semiconductor device inserted in the transmission line and having a first frequency determining circuit that determines a transfer speed of the data signal;
wherein the first frequency determining circuit includes:
- a switching detection circuit that detects a data switching, based on plural data signals that are latched at each of plural timings continuing with a predetermined interval;
- a first counter circuit that counts how many times the switching detected by the switching detection circuit occurs consecutively; and
- a first discrimination circuit that determines a frequency from a count value counted by the counter circuit, based on a relation between number of consecutive switchings and frequency associated with each other in advance.

10. The information processing system according to claim 9, wherein the third semiconductor device further includes:
- a receiver circuit that receives the data signal from the first semiconductor device;
- a clock data reproducing circuit that reproduces a data signal and a clock signal from a data signal outputted from the receiver circuit; and
- a driver circuit that transmits the data signal reproduced by the clock data reproducing circuit to the second semiconductor device.

11. The information processing system according to claim 10, wherein the driver circuit performs waveform shaping on the reproduced data signal, using an amount of waveform equalization based on a tap coefficient, and then transmits the data signal, and
the tap coefficient is changed, based on a result of determination by the first frequency determining circuit.

12. The information processing system according to claim 10, wherein the receiver circuit performs waveform shaping on the data signal received from the first semiconductor device, using an amount of equalization based on an equalization coefficient, and then outputs the data signal to the clock data reproducing circuit, and
the equalization coefficient is changed, based on a result of determination by the first frequency determining circuit.

13. The information processing system according to claim 10, wherein the third semiconductor device further includes a selection circuit that selects and outputs either the reproduced data signal or the data signal outputted from the receiver circuit, to the driver circuit,
- wherein the clock data reproducing circuit receives a result of determination by the first frequency determining circuit and operates with a frequency based on the result of determination, and
- the selection circuit selects the data signal outputted from the receiver circuit until the result of determination by the first frequency determining circuit is finalized, and the selection circuit selects the reproduced data signal when the result of determination by the first frequency determining circuit is finalized and the operation of the clock data reproducing circuit is stabilized.

14. The information processing system according to claim 9, wherein the first and second semiconductor devices carry out communication based on the PCI Express standard.

* * * * *